United States Patent
Mine et al.

(10) Patent No.: US 11,668,679 B2
(45) Date of Patent: Jun. 6, 2023

(54) INSPECTION DEVICE FOR DETERMINING INSERTION OF CONNECTOR, AND ROBOT DEVICE HAVING INSPECTION DEVICE

(71) Applicant: FANUC CORPORATION, Yamanashi (JP)

(72) Inventors: Takahide Mine, Yamanashi (JP); Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 373 days.

(21) Appl. No.: 16/902,272

(22) Filed: Jun. 16, 2020

(65) Prior Publication Data

US 2021/0003535 A1    Jan. 7, 2021

(30) Foreign Application Priority Data

Jul. 4, 2019    (JP) .............................. JP2019-125371

(51) Int. Cl.
*G01N 29/12*    (2006.01)
*B25J 9/16*    (2006.01)
(Continued)

(52) U.S. Cl.
CPC ............ *G01N 29/12* (2013.01); *B25J 9/1679* (2013.01); *B25J 15/00* (2013.01); *B25J 15/0616* (2013.01); *B25J 19/026* (2013.01); *G01H 13/00* (2013.01); *G01N 29/225* (2013.01); *G01N 29/28* (2013.01); *G01N 29/46* (2013.01); *H01R 43/26* (2013.01);
(Continued)

(58) Field of Classification Search
CPC . B23P 19/00; B23P 19/02; B23P 19/04; B25J 13/00; B25J 15/00; B25J 15/0616; B25J 15/08–12; B25J 19/026; B25J 9/161;
B25J 9/1679; G01B 17/00; G01H 13/00; G01N 2291/014; G01N 2291/2697; G01N 29/11; G01N 29/12; G01N 29/225;
(Continued)

(56) References Cited

U.S. PATENT DOCUMENTS

| 6,722,202 B1* | 4/2004 | Kennedy | G01N 29/265 73/644 |
| 2010/0242599 A1* | 9/2010 | Ogawa | H01R 13/641 73/488 |

FOREIGN PATENT DOCUMENTS

| JP | H1205993 A | 8/1989 |
| JP | H566886 U | 9/1993 |

(Continued)

OTHER PUBLICATIONS

Murakami, Tactile sensing method for estimating the insertion state of a connector, 2016 IEEE Sensors (Year: 2016).*
Tamada et al, High-Speed Manipulation of Cable Connector Using a High-Speed Robot Hand, Proceeding of the IEEE International Conference on Robotics and Biomimetics (ROBIO), Shenzhen, China, Dec. 2013 (Year: 2013).*

*Primary Examiner* — David L Singer
(74) *Attorney, Agent, or Firm* — Hauptman Ham, LLP

(57) ABSTRACT

An inspection device includes an oscillator for generating ultrasonic waves toward a first connector, and a vibration receiver for receiving vibrations generated in the first connector. The inspection device includes a vibration controller for analyzing the vibrations received by the vibration receiver. The vibration controller detects a resonance frequency by converting, by Fourier transform, the vibrations received by the vibration receiver. The vibration controller determines an insertion amount of the first connector into the second connector, based on the detected resonance frequency.

7 Claims, 17 Drawing Sheets

(51) Int. Cl.
    *B25J 19/02*     (2006.01)
    *B25J 15/06*     (2006.01)
    *G01N 29/28*     (2006.01)
    *G01N 29/22*     (2006.01)
    *B25J 15/00*     (2006.01)
    *G01N 29/46*     (2006.01)
    *H01R 43/26*     (2006.01)
    *G01H 13/00*     (2006.01)

(52) U.S. Cl.
    CPC ............... *G01N 2291/014* (2013.01); *G01N 2291/2697* (2013.01)

(58) Field of Classification Search
    CPC ...... G01N 29/265; G01N 29/28; G01N 29/46; G01R 31/68; H01R 43/26
    See application file for complete search history.

(56) References Cited

FOREIGN PATENT DOCUMENTS

| | | | |
|---|---|---|---|
| JP | H8168927 A | | 7/1996 |
| JP | 200511580 A | | 1/2005 |
| JP | 2007329055 A | | 12/2007 |
| JP | 2010008151 A | * | 1/2010 |
| JP | 201086868 A | | 4/2010 |
| JP | 2010199047 A | | 9/2010 |
| JP | 2013054039 A | * | 3/2013 |
| JP | 2016122568 A | | 7/2016 |
| JP | 2017199614 A | | 11/2017 |
| JP | 2019128193 A | * | 8/2019 |

* cited by examiner

INSPECTION DEVICE FOR DETERMINING INSERTION OF CONNECTOR, AND ROBOT DEVICE HAVING INSPECTION DEVICE

RELATED APPLICATIONS

The present application claims priority to Japanese Application Number 2019-125371, filed Jul. 4, 2019, the disclosure of which is hereby incorporated by reference herein in its entirety.

BACKGROUND OF THE INVENTION

1. Field of the Invention

The present invention relates to an inspection device which determines a state in which a connector is inserted and a robot device including the inspection device.

2. Description of the Related Art

In a process of manufacturing a product, one connector may be inserted into another connector. For example, a male connector may be inserted into a female connector. At this time, if the depth by which the male connector is inserted into the female connector is not appropriate, the connectors may be detached from each other when the product is used. Alternatively, if conductive terminals are formed in each connector, poor electrical conductivity may occur.

In prior arts, it is known to form claw parts in one connector, which engage with another connector. The claw parts cause one connector to be secured to the other connector when engaging with an engaging portion of the other connector. When the claw parts engage with the engaging portion, noises or vibrations occur. Devices which detect the noises or vibrations so as to determine whether one connector is appropriately inserted into the other connector are known (see, for example, Japanese Unexamined Patent Publication No. 2010-199047A and Japanese Unexamined Patent Publication No. 2016-122568A).

Further, in prior arts, devices which apply ultrasonic waves to a connector pin so as to vibrate the connector pin when the connector pin is inserted into a hole of a land formed on a substrate (see, for example, Japanese Unexamined Patent Publication No. 2010-86868A). In such devices, the connection of the connector pin to the hole is determined by comparing the waveform of a reflected wave received from the connector pin with the waveform of the reference reflected wave.

SUMMARY OF INVENTION

An operation for connecting one connector to another connector is performed in a step of connecting an electric circuit. For example, a male connector is inserted into a female connector secured to a printed circuit board. In order to inspect the insertion state of the connectors, an operator can perform an appearance inspection or a tactile inspection. Alternatively, an inspection for electrical conductivity between one connector and another connector can be performed.

However, the operator may make an erroneous determination when determining the insertion state of the connectors. Alternatively, in the inspection for electrical conductivity, even if the conductivity between the connectors is satisfactory, the insertion amount of one connector to the other connector may be small.

In prior arts, when one connector is inserted into another connector, it is difficult to quantitatively determine the insertion state. As a result, even when the result of the inspection for the insertion of one connector into the other connector is satisfactory, the connector may be disconnected or have poor electrical conductivity when the product is used. In particular, it is difficult to accurately determine the amount of insertion of one connector to the other connector.

An inspection device in an aspect of the present disclosure inspects a state in which a first connector having a shape to be fitted to a second connector is inserted into the second connector. The inspection device includes an oscillator which generates ultrasonic waves toward the first connector, and a vibration receiver which receives vibrations generated in the first connector. The inspection device includes a vibration controller which drives the oscillator and analyzes the vibrations received by the vibration receiver. The vibration controller detects a resonance frequency by converting, by Fourier transform, the vibrations received by the vibration receiver. The vibration controller determines an insertion amount of the first connector to the second connector based on the detected resonance frequency.

A robot device in an aspect of the present disclosure includes the above-described inspection device, a robot which moves an operation tool, and a robot controller which controls the robot. The inspection device includes an operation tool including an oscillator and a vibration receiver. The operation tool includes a grasping mechanism which grasps the first connector, and a base member which supports the grasping mechanism, the oscillator, and the vibration receiver. The oscillator is disposed so as to supply ultrasonic waves to the first connector while the first connector is grasped by the grasping mechanism. The vibration receiver is disposed so as to receive vibrations generated in the first connector while the first connector is grasped by the grasping mechanism. A reference resonance frequency when the first connector is inserted into the second connector by an appropriate insertion amount is previously determined. The vibration controller calculates the position and orientation of the robot, at which the insertion amount of the first connector is appropriate, based on the resonance frequency detected when the first connector is inserted into the second connector and the reference resonance frequency, and transmits the calculation result to the robot controller. The robot controller drives the robot so that the position and orientation of the robot are coincide with those received from the vibration controller.

DETAILED DESCRIPTION

With reference to FIGS. 1 to 21, an inspection device and a robot device including the inspection device in an embodiment will be described. In the present embodiment, an operation in which a first connector is inserted into a second connector is performed. The inspection device in the present embodiment inspects a state in which the first connector is inserted into the second connector. First, the robot device including a robot and the inspection device will be described.

Figure 1:
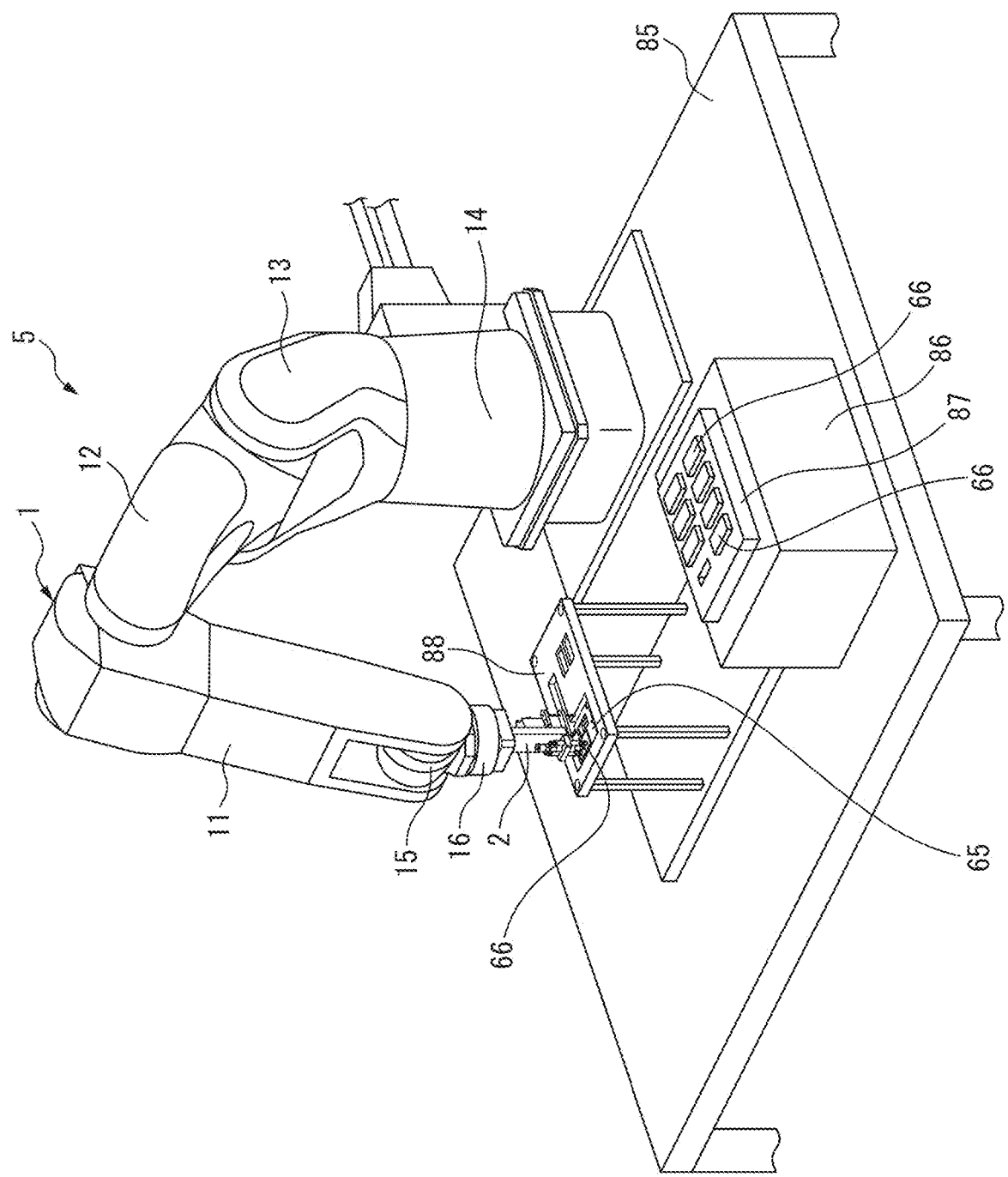
FIG. 1 is a perspective view of a robot device in an embodiment.

FIG. 1 is a schematic perspective view of the robot device in the present embodiment. A robot device 5 performs an operation of inserting a first connector 66 into a second connector 67 secured to a substrate 65 and an inspection for an insertion state of the first connector 66. Further, the robot device 5 adjusts the depth by which the first connector 66 is inserted into the second connector 67, based on the inspection result.

The robot device 5 includes a first operation tool 2 and a robot 1 as a device for moving the first operation tool 2. The robot device 5 is placed on a work table 85. The robot 1 of the present embodiment is an articulated robot including a plurality of joints. The robot 1 includes a base 14 secured to the work table 85 and a rotation base 13 supported by the base 14. The rotation base 13 is formed so as to rotate with respect to the base 14. The robot 1 includes an upper arm 11 and a lower arm 12. The lower arm 12 is rotatably supported by the rotation base 13 via a joint. The upper arm 11 is rotatably supported by the lower arm 12 via a joint. The upper arm 11 also rotates around a rotation axis parallel to the direction in which the upper arm 11 extends.

The robot 1 includes a wrist 15 connected to an end of the upper arm 11. The wrist 15 is rotatably supported by the upper arm 11 via a joint. The wrist 15 includes a rotatably formed flange 16. The operation tool 2 is secured to the flange 16. The robot 1 of the present embodiment has six drive axes, but the embodiment is not limited to this. Any robot which can change the position and orientation of the operation tool 2 can be adopted.

The substrate 65 is supported by a support member 88 placed on the work table 85. A plurality of first connectors 66 to be attached to the substrates 65 are arranged on the side of the support member 88. The plurality of first connectors 66 are housed in a case 87. The case 87 is supported by a support member 86 secured to the work table 85.

The operation tool 2 of the present embodiment grasps each first connector 66 by suction. In the robot device 5, the robot 1 changes its position and orientation, and picks up each first connector 66 disposed on the case 87. The robot 1 then changes its position and orientation and inserts each first connector 66 into the second connector 67 secured to the substrate 65.

Figure 2:
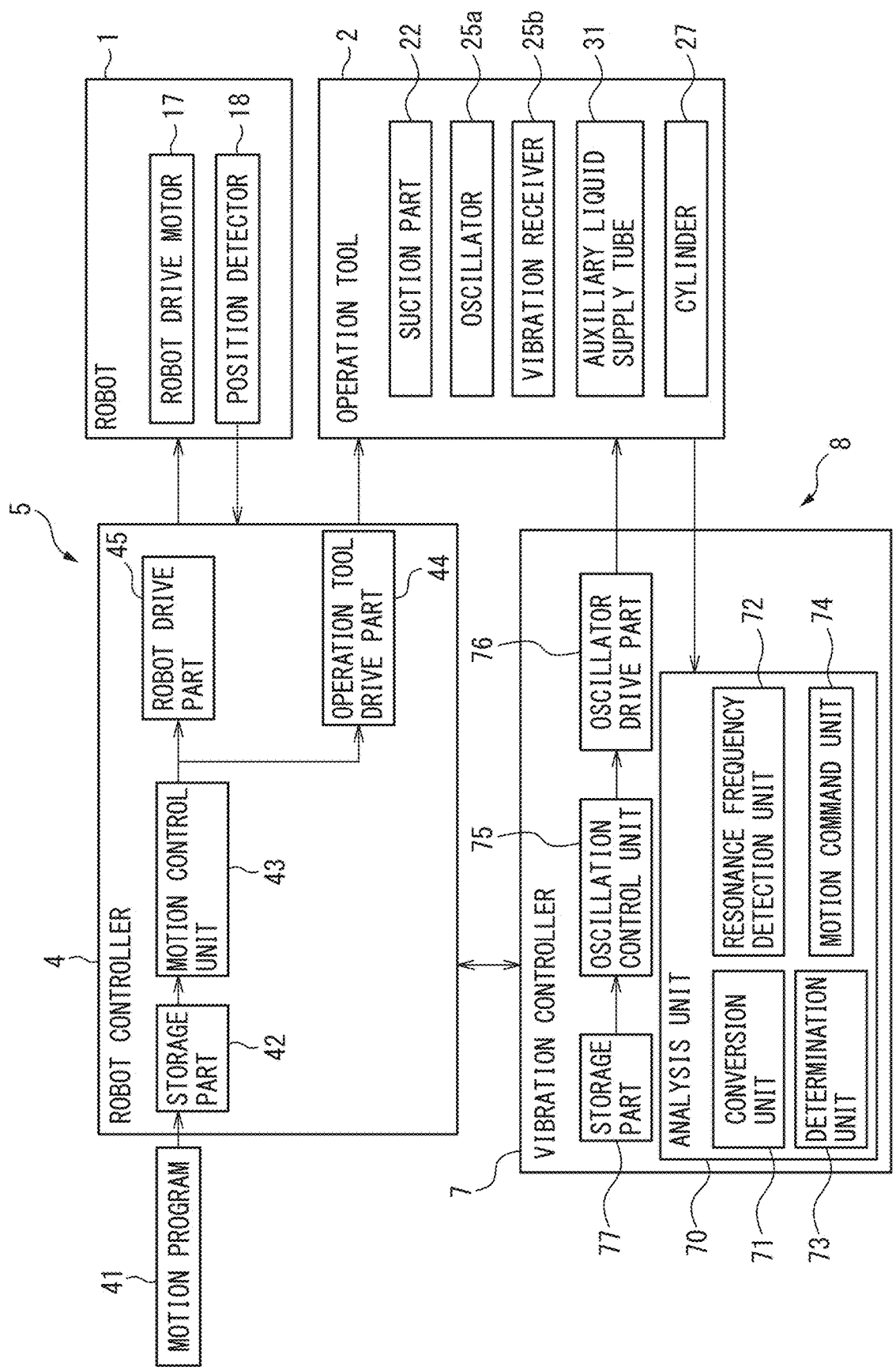
FIG. 2 is a block diagram of the robot device in an embodiment.

FIG. 2 is a block diagram of the robot device in the present embodiment. Referring to FIGS. 1 and 2, the robot 1 includes a robot driving device which changes the position and orientation of the robot 1. The robot driving device includes a plurality of robot drive motors 17 for driving components such as arms and a wrist. The robot drive motors 17 are driven and thereby change the direction of each component.

The robot device 5 includes a robot controller 4 which controls the robot 1 and the operation tool 2. The robot controller 4 includes an arithmetic processing device (computer) having a CPU (Central Processing Unit) as a processor. The arithmetic processing device has, for example, a RAM (Random Access Memory) and a ROM (Read Only Memory), which are connected to the CPU via a bus. A motion program 41 is input to the robot controller 4 in order to control the robot 1 and the operation tool 2. Alternatively, the robot controller 4 generates the motion program 41 by a teaching operation of an operator.

The robot controller 4 includes a storage part 42 which stores information on the control of the robot device 5. The storage part 42 can be composed of a storage medium capable of storing information, such as a volatile memory, a non-volatile memory, or a hard disk. The motion program 41 is stored in the storage part 42. The robot controller 4 of the present embodiment controls the robot 1 and the operation tool 2 based on the motion program 41.

The robot controller 4 includes a motion control unit 43 which transmits an operation command. The motion control unit 43 corresponds to a processor driven in accordance with the motion program 41. The motion control unit 43 is formed so as to be able to read the information stored in the storage part 42. The processor reads the motion program 41 and performs a control operation specified in the motion program 41 and thereby functions as the motion control unit 43. The motion control unit 43 transmits an operation command for driving the robot 1 based on the motion program 41, to a robot drive part 45. The robot drive part 45 includes an electric circuit which drives the robot drive motors 17. The robot drive part 45 supplies electricity to the robot drive motors 17 based on the operation command.

The robot 1 includes a state detector for detecting the position and orientation of the robot 1. The state detector in the present embodiment includes position detectors 18 attached to the robot drive motors 17. Each position detector 18 is composed of, for example, an encoder. The robot controller 4 detects the position and orientation of the robot 1 based on the output of the position detectors 18.

The motion control unit 43 transmits an operation command for driving the operation tool 2 based on the motion program 41 to an operation tool drive part 44. The operation tool drive part 44 includes an electric circuit which drives a drive device for the operation tool 2. The operation tool drive part 44 supplies electricity to an air supply device including, for example, an air pump and a valve for driving a cylinder 27, based on the operation command. The operation tool drive part 44 supplies electricity to a decompression device including a vacuum pump and a valve for driving suction parts 22, based on the operation command. In addition, the operation tool drive part 44 supplies electricity to an auxiliary liquid supply device including a pump and a valve for supplying the auxiliary liquid, based on the operation command.

Figure 3:
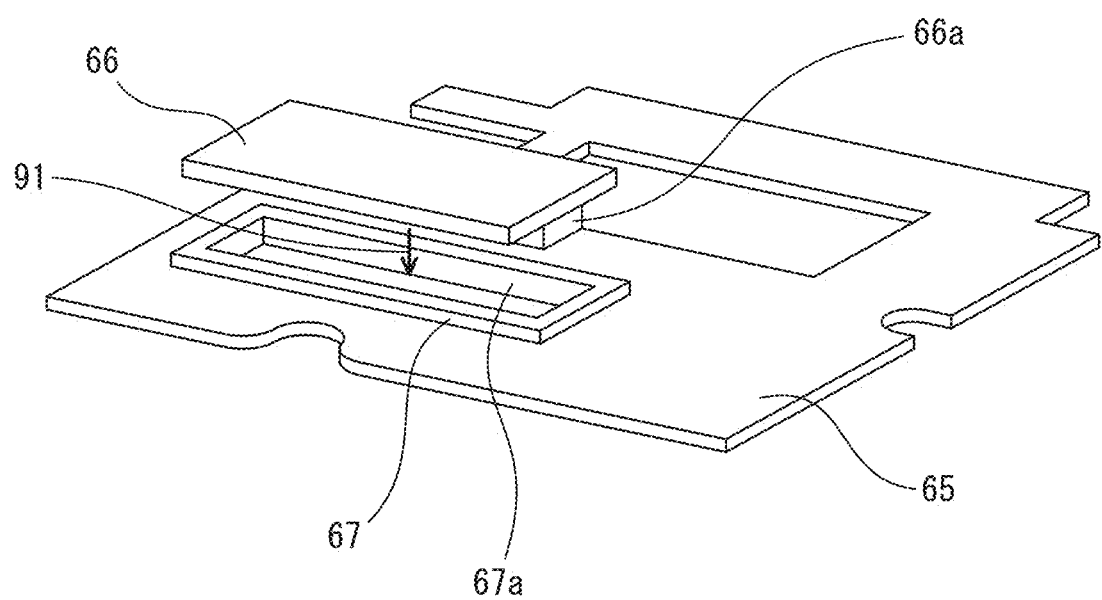
FIG. 3 is a perspective view for explaining a first connector and a second connector in an embodiment.

FIG. 3 is a perspective view of a first connector, a second connector, and a substrate in the present embodiment. The robot device 5 of the present embodiment grasps the first connector 66 and inserts it into the second connector 67 as designated by arrow 91. The second connector 67 is secured to the substrate 65. The first connector 66 has a shape which fits into the second connector 67. The first connector 66 of the present embodiment is a male connector having a projection part 66a. The second connector 67 is a female connector having a recess part 67a. The first connector 66 and the second connector 67 are formed such that the projection part 66a fits into the recess part 67a.

Further, a plurality of electrodes are formed on the first connector 66 and the second connector 67 of the present embodiment. When the first connector 66 is inserted into the second connector 67 and then the electrodes of the first connector 66 and the electrodes of the second connector 67 come into contact with each other, electrical conductivity is achieved.

Figure 4:
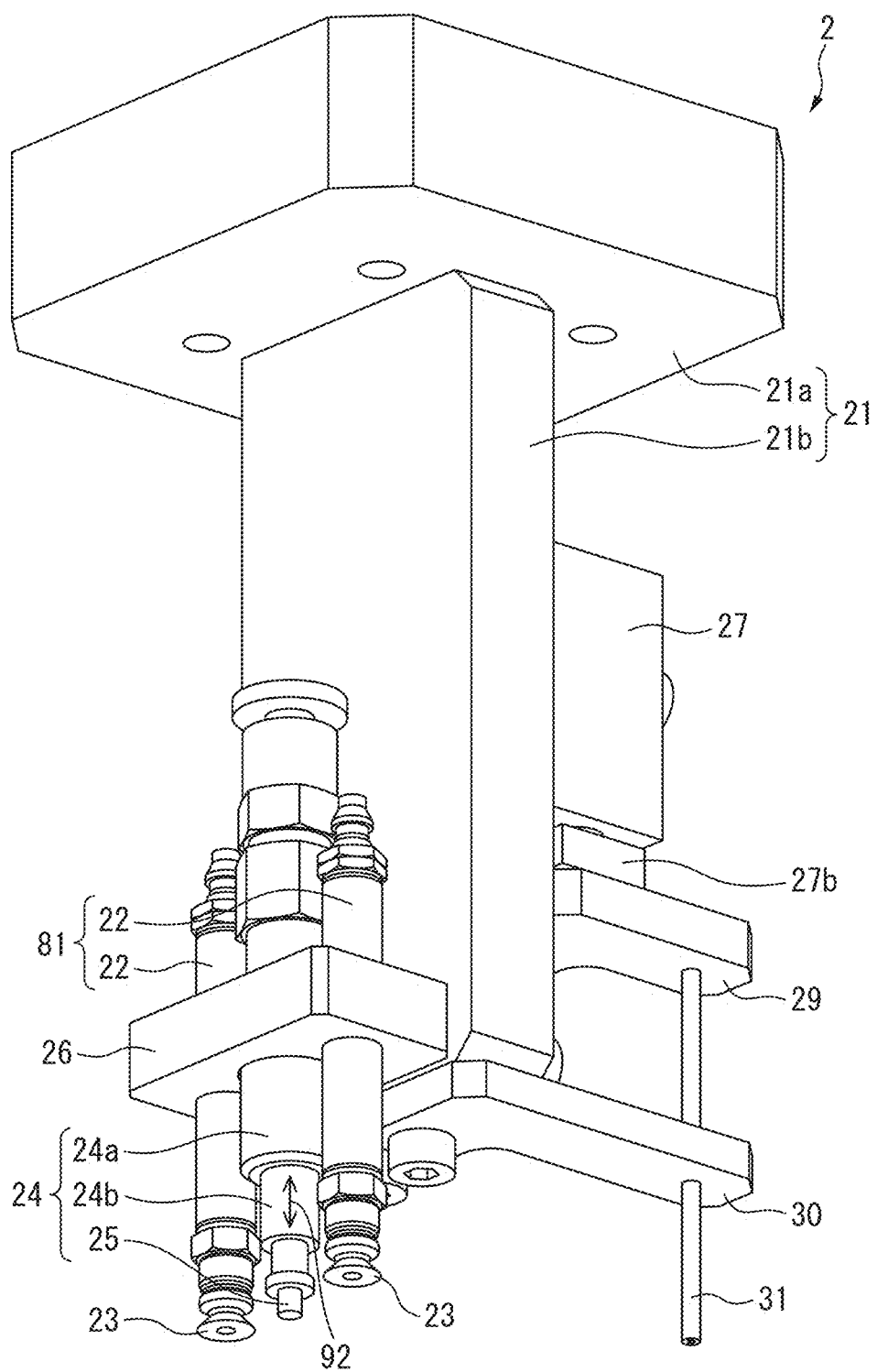
FIG. 4 is a perspective view of a first operation tool in an embodiment when viewed from the front side.
Figure 5:
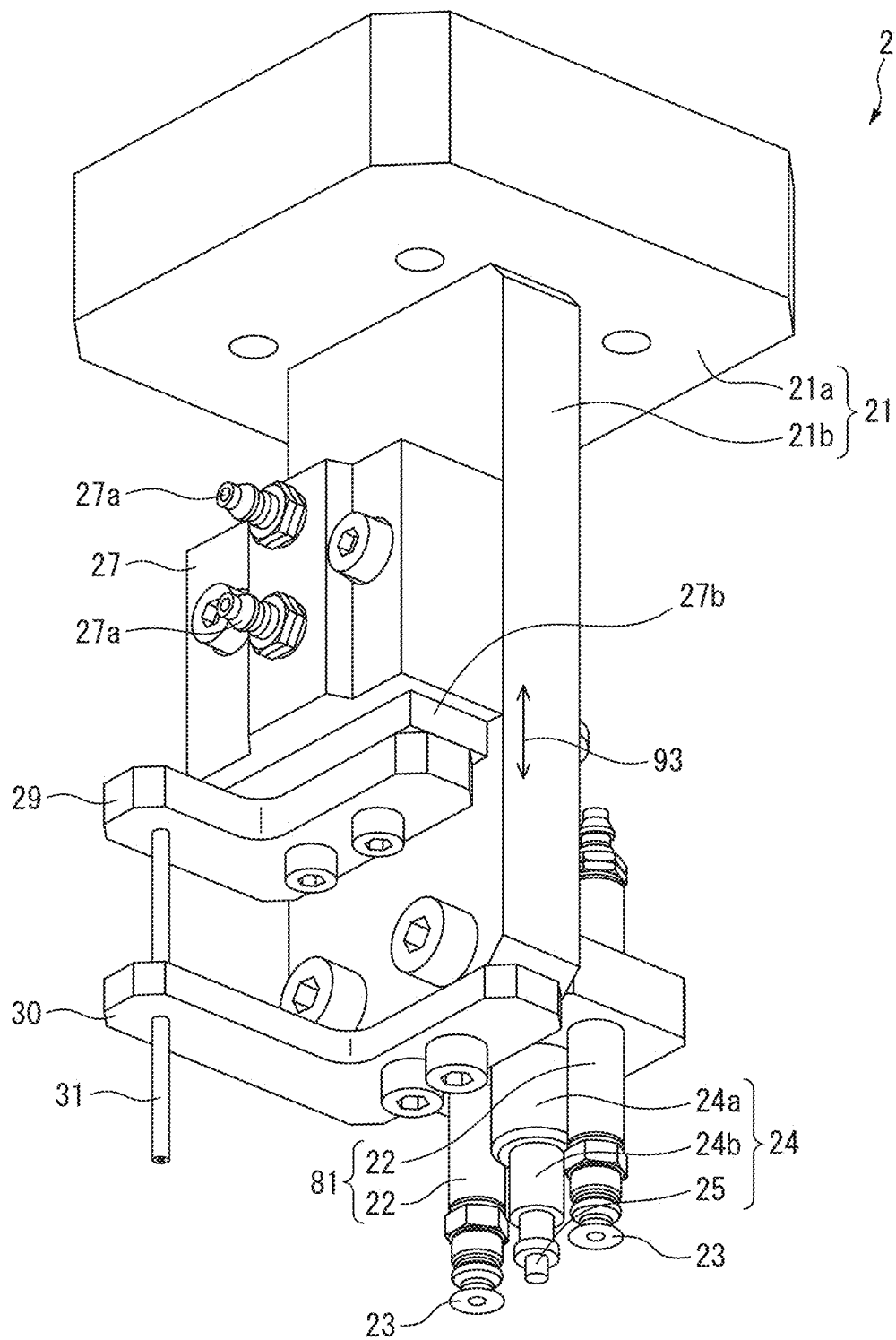
FIG. 5 is a perspective view of the first operation tool when viewed from the rear side.

FIG. 4 is a perspective view of a first operation tool in the present embodiment when viewed from the front side. FIG. 5 is a perspective view of the first operation tool in the present embodiment when viewed from the rear side. Referring to FIGS. 4 and 5, the first operation tool 2 is secured to the flange 16 of the robot 1. The operation tool 2 includes a base member 21. The base member 21 has a flange part 21a secured to the flange 16 of the wrist 15, and an erected part 21b formed so as to extend from the flange part 21a. The erected part 21b is formed so as to stand from the flange part 21a.

The operation tool 2 includes a grasping mechanism 81 which grasps the first connector 66. The grasping mechanism 81 includes suction parts 22 which grasp the first connector 66 by suction. In the present embodiment, a plurality of suction parts 22 are secured to the erected part 21b via a support member 26. The suction parts 22 are disposed so as to project below the end face of the erected part 21b. The two suction parts 22 are spaced from each other. Each suction part 22 has, on its tip, a suction pad 23. The suction pad 23 is formed of a shape-variable material such as rubber. An air tube is connected to each suction part 22 at an end opposite to the end on which the suction pad 23 is disposed. The suction parts 22 are connected to a decompression device via air tubes. The decompression device includes a vacuum pump, and valves for opening and closing flow paths of the air tubes.

The operation tool 2 includes a vibration detector 24 having a function of generating ultrasonic waves toward each first connector 66 and a function of receiving vibrations generated in the first connector 66. The vibration detector 24 is secured to the erected part 21b via the support member 26. The vibration detector 24 is disposed between the suction parts 22. The vibration detector 24 has, on its tip, an element component 25.

Figure 6:
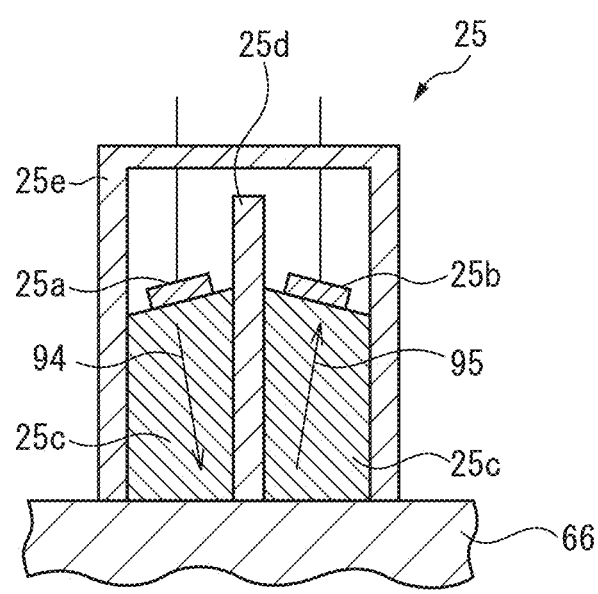
FIG. 6 is a schematic sectional view of an element component of a vibration detector in an embodiment.

FIG. 6 is a schematic sectional view of the element component of the vibration detector. The element component 25 includes an oscillator 25a which generates ultrasonic waves toward each first connector 66, and a vibration receiver 25b which receives vibrations generated in the first connector 66. The oscillator 25a and the vibration receiver 25b are formed of, for example, a piezoelectric element. The oscillator 25a and the vibration receiver 25b are disposed inside a case 25e. The oscillator 25a and the vibration receiver 25b are disposed on the surface of a delay material 25c. A separator 25d for preventing transmission of ultrasonic waves is disposed between the oscillator 25a and the vibration receiver 25b. The separator 25d is formed so as to divide the delay material 25c.

When AC power is supplied to the oscillator 25a, ultrasonic waves are generated toward each first connector 66 as indicated by arrow 94. Further, the vibrations generated in the first connector 66 by the ultrasonic waves propagate through the delay material 25c as indicated by arrow 95. The vibrations generated in the first connector 66 are then detected by the vibration receiver 25b. The vibration signals detected by the vibration detector 24 are transmitted to a vibration controller 7 via a cable.

In the vibration detector in the present embodiment, the vibration generator and the vibration receiver are disposed inside a single case. However, the embodiment is not limited to this. The vibration generator and the vibration receiver may be separately disposed. For example, the oscillator may be disposed so as to be in contact with the first connector, and the vibration receiver may be disposed so as to be in contact with the first connector.

Referring to FIGS. 4 and 5, the vibration detector 24 in the present embodiment has a slide part 24b to which the element component 25 is secured, and a support part 24a which supports the slide part 24b. The slide part 24b is formed so as to slide with respect to the support part 24a as indicated by arrow 92. A spring is disposed inside the support part 24a. The slide part 24b is biased so as to be projected from the support part 24a by a spring action. The element component 25 is disposed so that the end face of the element component 25 protrudes from a plane including the tips of the suction pads 23 by a spring action. When coming into contact with the first connector 66, the element component 25 moves toward the inside of the support part 24a and is pressed by an appropriate pressing force.

When the first connector 66 is grasped by the operation tool 2, the element component 25 first comes into contact with the surface of the first connector 66. The slide part 24b moves toward the inside of the support part 24a. Thereafter, the suction pads 23 can come into contact with the surface of the first connector 66 and grasp the first connector 66 by suction.

The operation tool 2 in the present embodiment has a supply tube 31 for supplying auxiliary liquid as a propagation promoter for promoting the propagation of ultrasonic waves to the surface of each first connector 66. As the propagation promoter, a liquid substance which promotes the propagation of ultrasonic waves can be adopted. The propagation promoter may be, for example, a gel substance having viscosity. Further, the propagation promoter is preferably a volatile liquid so as to evaporate after the measurement of vibrations is completed. In the present embodiment, ethanol is adopted as the auxiliary liquid. The supply tube 31 is connected to an auxiliary liquid supply device including, for example, a tank, a pump, and a valve for supplying the auxiliary liquid.

The supply tube 31 is supported by the erected part 21*b* via a tube support member 30. The tube support member 30 supports the supply tube 31 so that the supply tube 31 moves in the axial direction. The supply tube 31 is disposed so as to extend downward along the extending direction of the erected part 21*b*. The operation tool 2 has a mechanism for moving the supply tube 31 toward each first connector 66. The operation tool 2 has a cylinder 27 secured to the erected part 21*b*. The cylinder 27 has air ports 27*a* and a piston 27*b*. The air ports 27*a* are connected to an air supply device, which supplies pressurized air, via air tubes.

A tube support member 29 is secured to the piston 27*b*. An end of the supply tube 31 is secured to the tube support member 29. The cylinder 27 is driven and thereby moves the piston 27*b* and the tube support member 29 in the direction designated by arrow 93. As the piston 27*b* moves, the supply tube 31 moves in the direction in which the first connectors 66 is arranged. Thus, the supply tube 31 which moves toward the first connector 66 is disposed in the operation tool 2.

Referring to FIGS. 2, 4 and 5, the robot device 5 of the present embodiment includes a first inspection device 8 for inspecting a state in which each first connector 66 is inserted into the second connector 67. The inspection device 8 includes the vibration detector 24 including the oscillator 25*a* and the vibration receiver 25*b*, and the vibration controller 7. The vibration controller 7 has a function of driving the oscillator 25*a* and a function of analyzing the vibrations received by the vibration receiver 25*b*.

The vibration controller 7 includes an arithmetic processing device (computer) including a CPU as a processor. The vibration controller 7 is formed so as to mutually communicate with the robot controller 4. The vibration controller 7 has a storage part 77 which stores information about vibrations. The storage part 77 can be composed of a storage medium capable of storing information, such as a volatile memory, a non-volatile memory, or a hard disk.

The vibration controller 7 generates ultrasonic waves and receives vibrations based on the motion program 41. The vibration controller 7 has an oscillation control unit 75 which controls the oscillator 25*a*. The oscillation control unit 75 transmits an operation command for driving the oscillator 25*a* to an oscillator drive part 76 based on the motion program 41. The oscillator drive part 76 has an electric circuit for driving the oscillator 25*a*. The oscillator drive part 76 supplies electricity to the oscillator 25*a* based on the operation command.

The vibration receiver 25*b* can detect the magnitude of vibrations with respect to time. The vibration controller 7 has an analysis unit 70 which analyzes the vibrations received by the vibration receiver 25*b*. The analysis unit 70 includes a conversion unit 71 which calculates a power spectrum by converting, by Fourier transform, the vibrations detected by the vibration receiver 25*b*. The analysis unit 70 has a resonance frequency detection unit 72 which detects the resonance frequency of vibration based on the power spectrum calculated by the conversion unit 71.

The analysis unit 70 has a determination unit 73 which determines based on the resonance frequency detected by the resonance frequency detection unit 72. The determination unit 73 determines the depth by which each first connector 66 is inserted into the second connector 67. In other words, the determination unit 73 determines the amount of insertion of the first connector 66 into the second connector 67. The analysis unit 70 has a motion command unit 74 which transmits an operation command for driving the robot 1, based on the determination result of the determination unit 73. The motion command unit 74 transmits a command for changing the position and orientation of the robot 1 to the robot controller 4.

Note that each of the units, such as the oscillation control unit 75, the analysis unit 70, and the conversion unit 71 included in the analysis unit 70, corresponds to the processor driven in accordance with the motion program 41. The processor reads the motion program 41 and performs the control operation specified in the motion program 41 so as to function as each unit.

Figure 7:
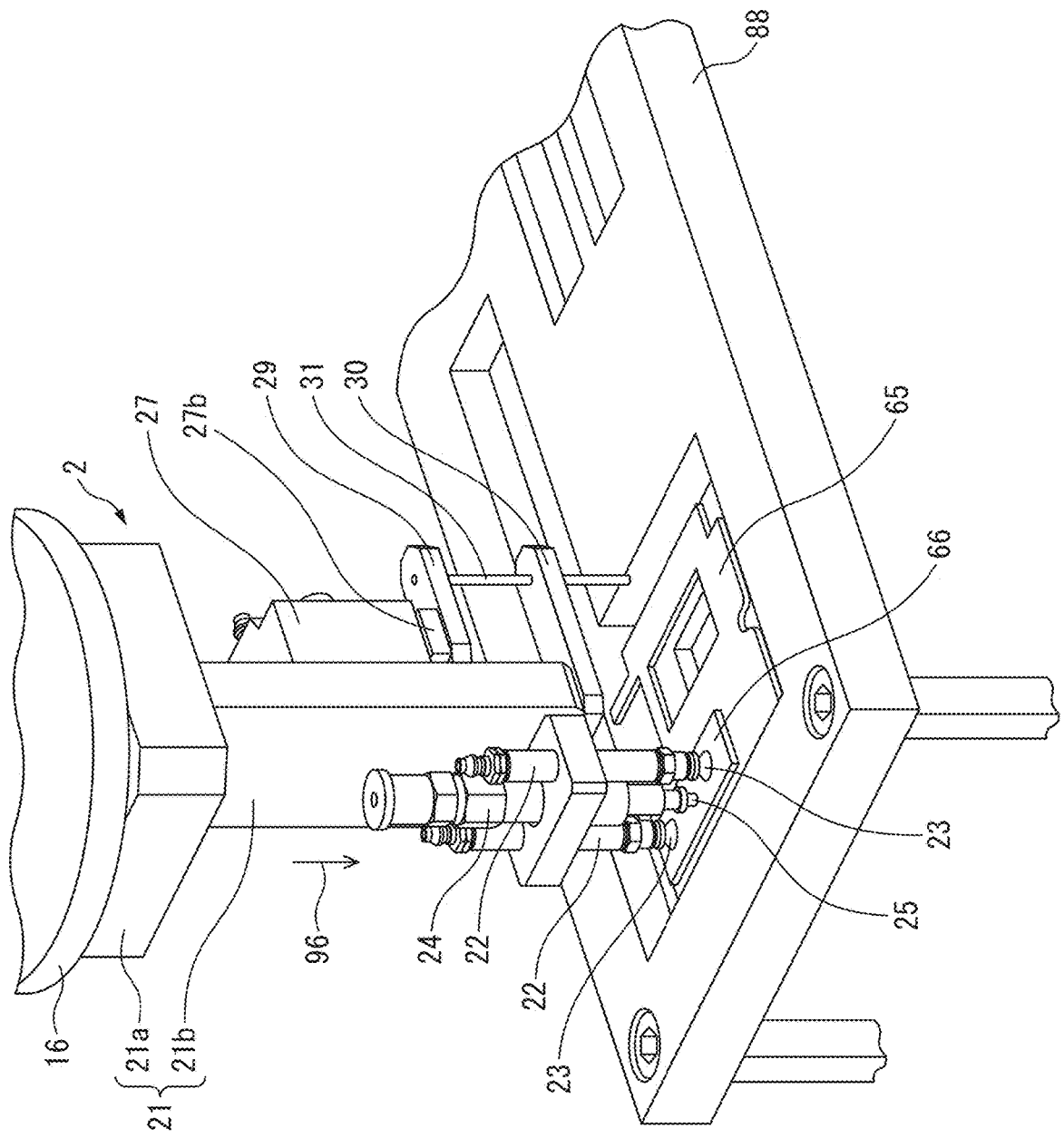
FIG. 7 is an enlarged perspective view of the robot device in which the first connector is attached to the second connector.

FIG. 7 is an enlarged perspective view of the operation tool when the first connector is inserted into the second connector in the robot device. The operation tool 2 can grasp the first connector 66 with the suction parts 22. The robot 1 changes its position and orientation so as to be able to insert the first connector 66 into the second connector 67. At this time, the element component 25 of the vibration detector 24 is in contact with the surface of the first connector 66.

The oscillator 25*a* of the present embodiment is disposed so that ultrasonic waves can be supplied to the first connector 66 while the first connector 66 is grasped by the suction parts 22. Further, the vibration receiver 25*b* is disposed so as to receive the vibrations generated in the first connector 66 while the first connector 66 is grasped by the suction parts 22. By adopting this configuration, it is possible to determine a state in which the first connector 66 is inserted into the second connector 67 while grasping the first connector 66.

Figure 8:
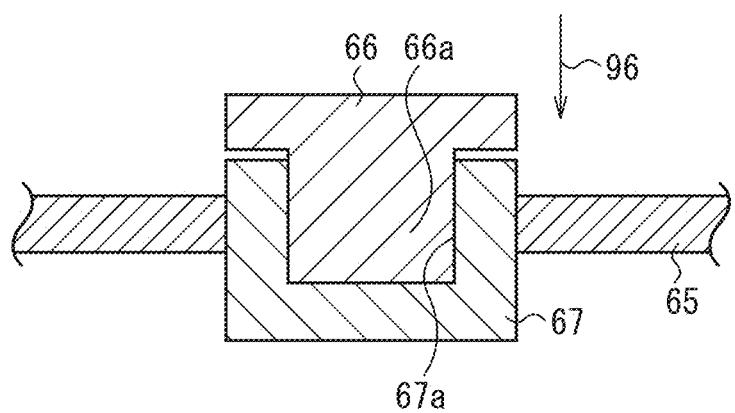
FIG. 8 is a schematic sectional view of the first connector and the second connector when the first connector is inserted into the second connector by an appropriate depth.

FIG. 8 is a schematic sectional view of the first connector and the second connector when the first connector is inserted into the second connector by an appropriate insertion amount. The first connector 66 is inserted by the robot device 5 in the direction indicated by arrow 96. In the present embodiment, when the first connector 66 is inserted into the second connector 67 by an appropriate depth, the bottom surface of the projection part 66*a* of the first connector 66 comes into contact with the bottom surface of the recess part 67*a* of the second connector 67.

Figure 9:
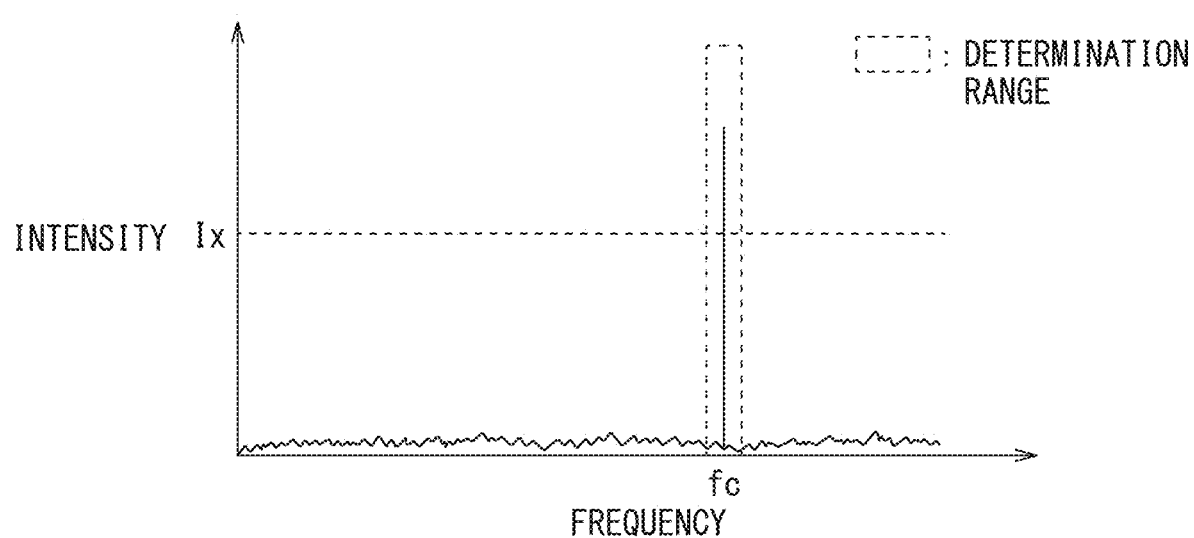
FIG. 9 shows a power spectrum when the first connector is appropriately inserted into the second connector.

FIG. 9 is a graph of values, converted by Fourier transform, obtained when the first connector is appropriately inserted. FIG. 9 is a power spectrum obtained by the conversion unit 71. Referring to FIGS. 2 and 9, the oscillation control unit 75 transmits a command for generating ultrasonic waves to the oscillator 25*a* after the robot device 5 inserts the first connector 66 into second connector 67. In the present embodiment, the oscillation control unit 75 controls the oscillator 25*a* so as to generate ultrasonic waves while continuously changing the frequency. For example, the oscillation control unit 75 controls the oscillator 25*a* so as to continuously change the frequency of ultrasonic waves from a low frequency to a high frequency so that the frequency band includes a resonance frequency expected to be generated by resonance.

A control operation for generating ultrasonic waves having different frequencies while continuously changing the frequency ensures the generation of resonance determined depending on the structure and material of the first connector 66, the second connector 67, and the substrate 65. As a result, the resonance frequency can be reliably detected.

Note that the control for generating ultrasonic waves by using the oscillation control unit is not limited to this embodiment. The oscillation control unit may control the oscillator so as to generate ultrasonic waves discretely while changing the frequency little by little. Alternatively, the oscillation control unit may control the oscillator so that, when the generation of ultrasonic waves of one frequency causes no resonance, the oscillator generates ultrasonic waves of another frequency.

The conversion unit 71 in the present embodiment acquires a power spectrum by converting, by Fourier transform, the intensity of vibrations, which is a function of time. As shown in FIG. 9, in the power spectrum, the horizontal axis is the frequency f of vibrations, and the vertical axis is the intensity I of vibrations, which corresponds to the amplitude of vibrations. The resonance frequency detection unit 72 detects a resonance frequency based on the intensity I of the power spectrum. The resonance frequency detection unit 72 of the present embodiment detects a frequency, at which the intensity I is higher than a predetermined determination value Ix, as a resonance frequency. Such a determination value Ix is previously determined and stored in the storage part 77. In the example shown in FIG. 9, the resonance frequency fc is detected by the resonance frequency detection unit 72.

When the first connector 66 is inserted by an appropriate insertion amount, the first connector 66 and the second connector 67 resonate at the resonance frequency fc. In the present embodiment, this resonance frequency is referred to as a reference resonance frequency fc. Further, in the present embodiment, the determination range of the resonance frequency for determining whether the insertion amount of the first connector 66 remains within the allowable range is previously determined. The determination range is set so as to include the reference resonance frequency fc. The determination range of the resonance frequency is stored in the storage part 77.

In the present embodiment, when at least a part of the first connector 66 is inserted into the second connector 67, vibrations are generated in the first connector 66 and the second connector 67. The resonance frequency changes depending on the depth by which the first connector 66 is inserted into the second connector 67. In the present embodiment, the resonance frequency is detected by intentionally vibrating the first connector 66 and the second connector 67. Then, based on the resonance frequency, whether the insertion amount of the first connector 66 is appropriate is determined.

The determination unit 73 of the analysis unit 70 determines that the insertion amount of the first connector 66 is appropriate when the resonance frequency f detected by the resonance frequency detection unit 72 remains within the determination range. Meanwhile, the determination unit 73 determines that the insertion amount of the first connector 66 is inappropriate when the resonance frequency f detected by the resonance frequency detection unit 72 deviates from the determination range.

Figure 10:
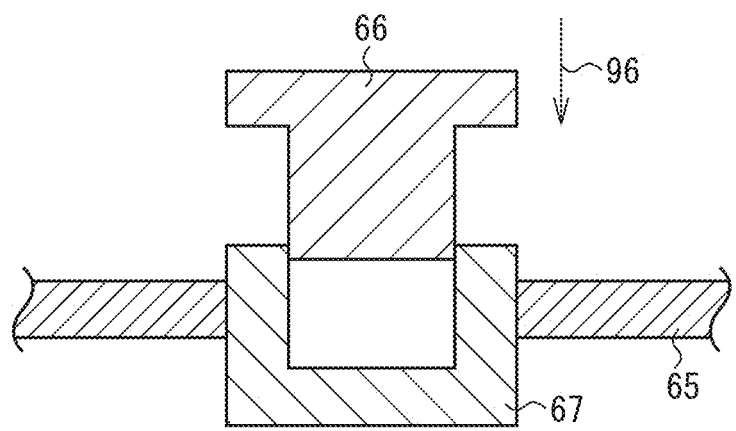
FIG. 10 is a schematic sectional view of the first connector and the second connector when the insertion amount of the first connector into the second connector is extremely small.
Figure 11:
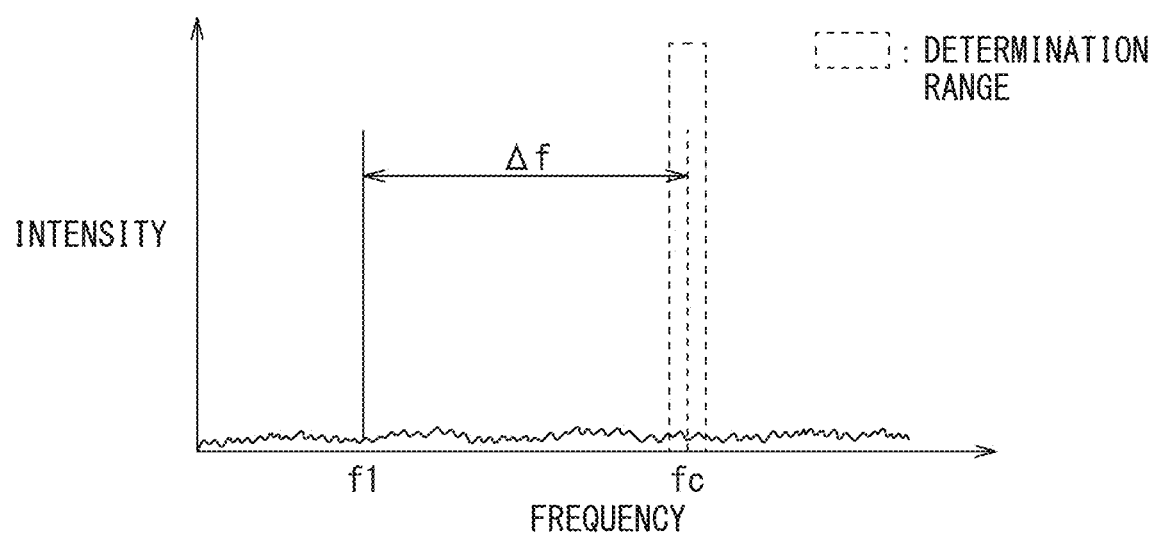
FIG. 11 shows a power spectrum when the insertion amount of the first connector into the second connector is extremely small.

FIG. 10 is a schematic sectional view of the first connector and the second connector when the insertion amount of the first connector is extremely small. FIG. 11 is a graph of values, converted by Fourier transform, obtained when the insertion amount of the first connector is extremely small. Referring to FIGS. 10 and 11, if the depth by which the first connector 66 is inserted into the second connector 67 is extremely small, when ultrasonic waves are applied to the first connector 66, vibrations are generated at a small frequency. The resonance frequency f1 detected by the resonance frequency detection unit 72 is lower than the reference resonance frequency fc. In the example shown in FIG. 11, the resonance frequency f1 is lower than the determination range. The determination unit 73 can determine that the insertion amount of the first connector 66 is small.

Figure 12:
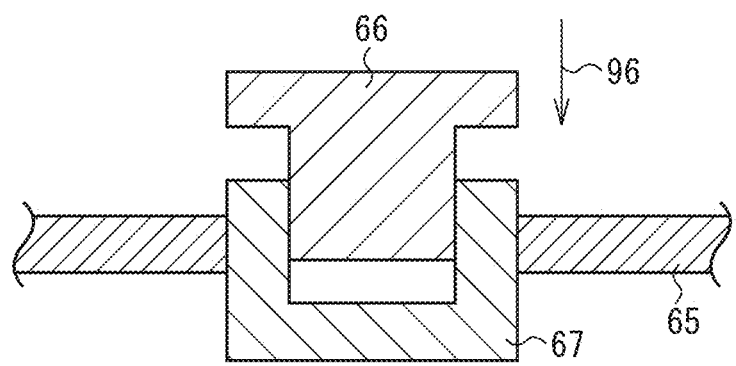
FIG. 12 is a schematic sectional view of the first connector and the second connector when the insertion amount of the first connector into the second connector is slightly small.
Figure 13:
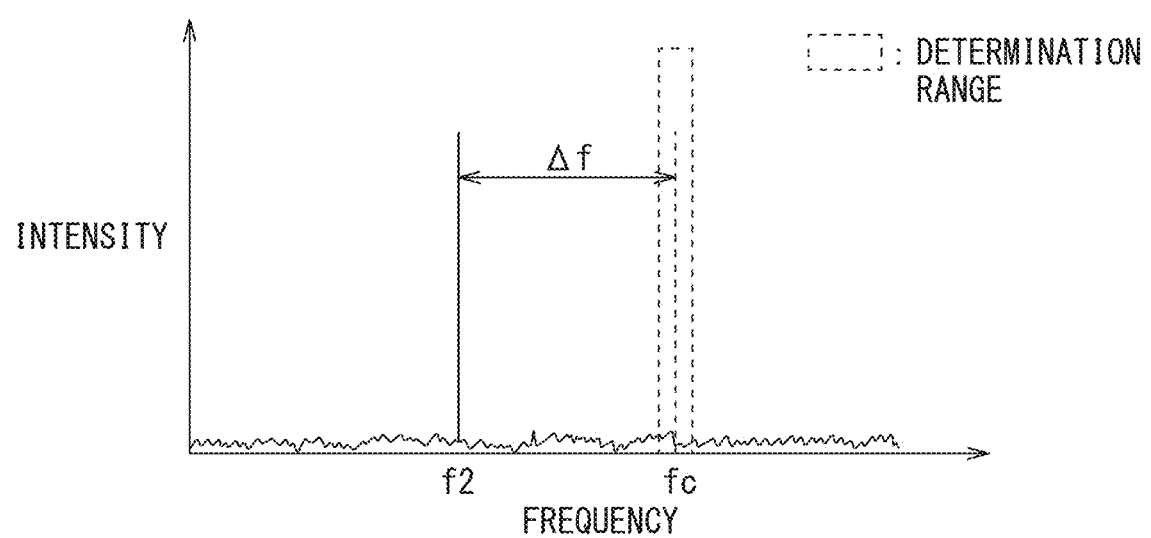
FIG. 13 shows a power spectrum when the insertion amount of the first connector into the second connector is slightly small.

FIG. 12 is a schematic sectional view of the first connector and the second connector when the insertion amount of the first connector is slightly small. FIG. 13 is a graph of values, converted by Fourier transform, obtained when the insertion amount of the first connector is slightly small. Referring to FIGS. 12 and 13, the depth by which the first connector 66 is inserted is small, and accordingly, the resonance frequency f2 detected by the resonance frequency detection unit 72 is lower than the reference resonance frequency fc. In the example shown in FIG. 13, the resonance frequency f2 is lower than the determination range. For this reason, the determination unit 73 can determine that the insertion amount of the first connector 66 is small. Note that the first connector 66 in FIG. 12 is inserted deeper than that in FIG. 10, the resonance frequency f2 is closer to the reference resonance frequency fc than the resonance frequency f1.

Figure 14:
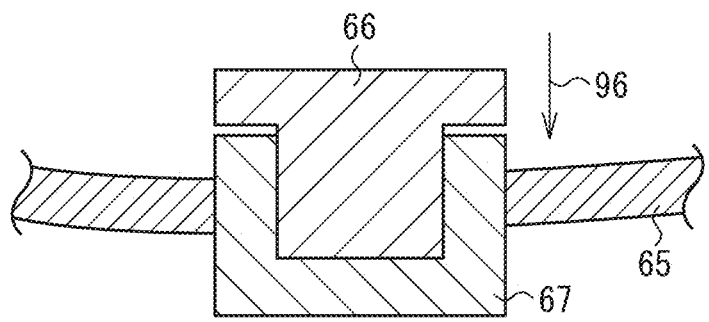
FIG. 14 is a schematic sectional view of the first connector and the second connector when the insertion amount of the first connector into the second connector is large.
Figure 15:
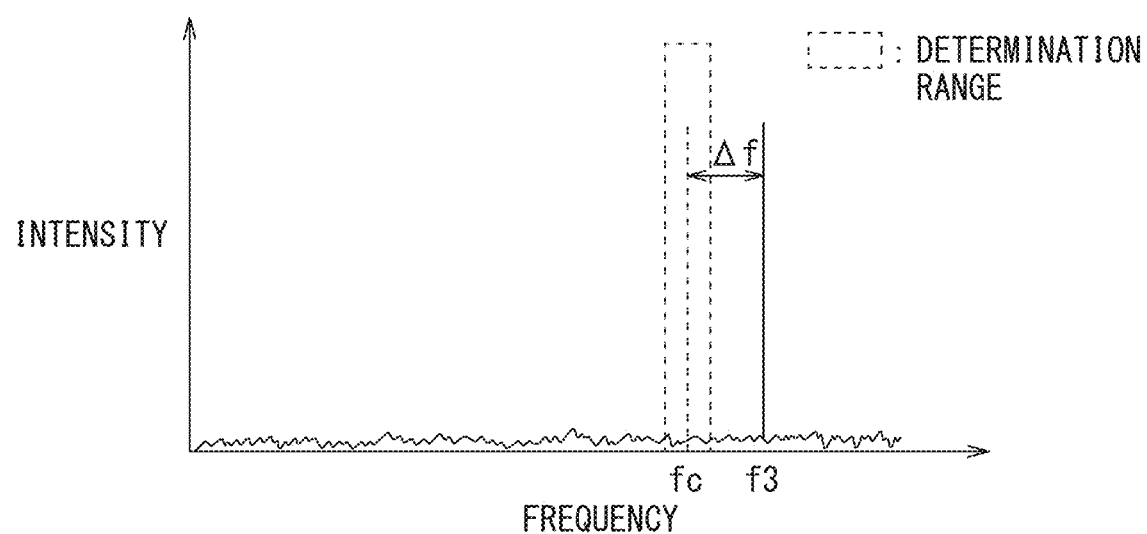
FIG. 15 shows a power spectrum when the insertion amount of the first connector into the second connector is large.

FIG. 14 is a schematic sectional view of the first connector and the second connector when the insertion amount of the first connector is larger than an appropriate insertion amount. FIG. 15 is a graph of values, converted by Fourier transform, obtained when the insertion amount of the first connector is larger than an appropriate insertion amount. Referring to FIGS. 14 and 15, the robot device 5 may insert the first connector 66 by an insertion amount larger than an appropriate insertion amount, as indicated by arrow 96. In the example shown in FIG. 14, the first connector 66 is inserted deeply, and accordingly, the substrate 65, to which the second connector 67 is secured, is slightly bent. At this time, the resonance frequency f3 detected by the resonance frequency detection unit 72 is higher than the reference resonance frequency fc. In the example shown in FIG. 15, the resonance frequency f3 is higher than the determination range. In this respect, the determination unit 73 can determine that the insertion amount of the first connector 66 is larger than an appropriate insertion amount.

As described above, the determination unit 73 of the analysis unit 70 in the present embodiment can determine whether the insertion amount of the first connector 66 is appropriate.

Further, referring to FIGS. 10 to 13, as the insertion amount of the first connector 66 deviates from an appropriate insertion amount, the resonance frequency f detected by the resonance frequency detection unit 72 deviates from the reference resonance frequency fc. The insertion amount (insertion depth) of the first connector 66 can be estimated based on the difference Δf between the reference resonance frequency fc and the detected resonance frequency f. The vibration controller 7 of the present embodiment performs a correction control operation for correcting the position and orientation of the robot 1 based on the resonance frequency f detected by the resonance frequency detection unit 72 and the reference resonance frequency fc. In particular, the vibration controller 7 can perform the correction control operation when the resonance frequency detected by the resonance frequency detection unit 72 deviates from the determination range.

The analysis unit 70 has a motion command unit 74 which transmits a command for correcting the position and orientation of the robot 1 based on the resonance frequency detected by the resonance frequency detection unit 72. The motion command unit 74 calculates the position and orientation of the robot 1 when the insertion amount of the first connector 66 is appropriate, based on the detected resonance frequencies f1, f2, f3 and the reference resonance frequency fc. The motion command unit 74 transmits the corrected position and orientation of the robot 1 to the robot controller 4. The motion control unit 43 of the robot controller 4 drives the robot 1 so that the robot 1 takes the position and orientation received from the vibration controller 7.

For example, in the examples shown in FIGS. 10 and 11, the motion command unit 74 calculates the difference Δf between the reference resonance frequency fc and the resonance frequency f1 detected by the resonance frequency detection unit 72. The amount of movement of the position and orientation of the robot 1 with respect to the difference Δf in resonance frequency (the amount of movement of the first connector 66) is previously determined and stored in the storage part 77. The larger the difference Δf in resonance frequency, the larger the amount of movement. The motion command unit 74 calculates the amount of movement of the position and orientation of the robot 1 based on the difference Δf in resonance frequency.

The motion command unit 74 calculates the position and orientation of the robot 1 when the first connector 66 is appropriately inserted, based on the current position and orientation of the robot 1 and the amount of movement of the robot 1. In this example, the motion command unit 74 calculates the position and orientation of the robot 1 after the first connector 66 is further inserted. The motion command unit 74 transmits the corrected position and orientation of the robot 1 to the robot controller 4. The motion control unit 43 of the robot controller 4 corrects the position and orientation of the robot 1.

As in the example shown in FIGS. 14 and 15, the motion command unit 74 calculate the amount of movement (the amount of withdrawal) of the first connector 66 based on the difference Δf between the resonance frequency f3 detected by the resonance frequency detection unit 72 and the reference resonance frequency fc. The motion command unit 74 calculates the position and orientation of the robot 1 when the first connector 66 is disposed at an appropriate position, based on the amount of withdrawal of the first connector 66 and the current position and orientation of the robot 1. The motion command unit 74 transmits, to the robot controller 4, the position and orientation after the robot 1 moves. The motion control unit 43 of the robot controller 4 corrects the position and orientation of the robot 1.

Figure 16:
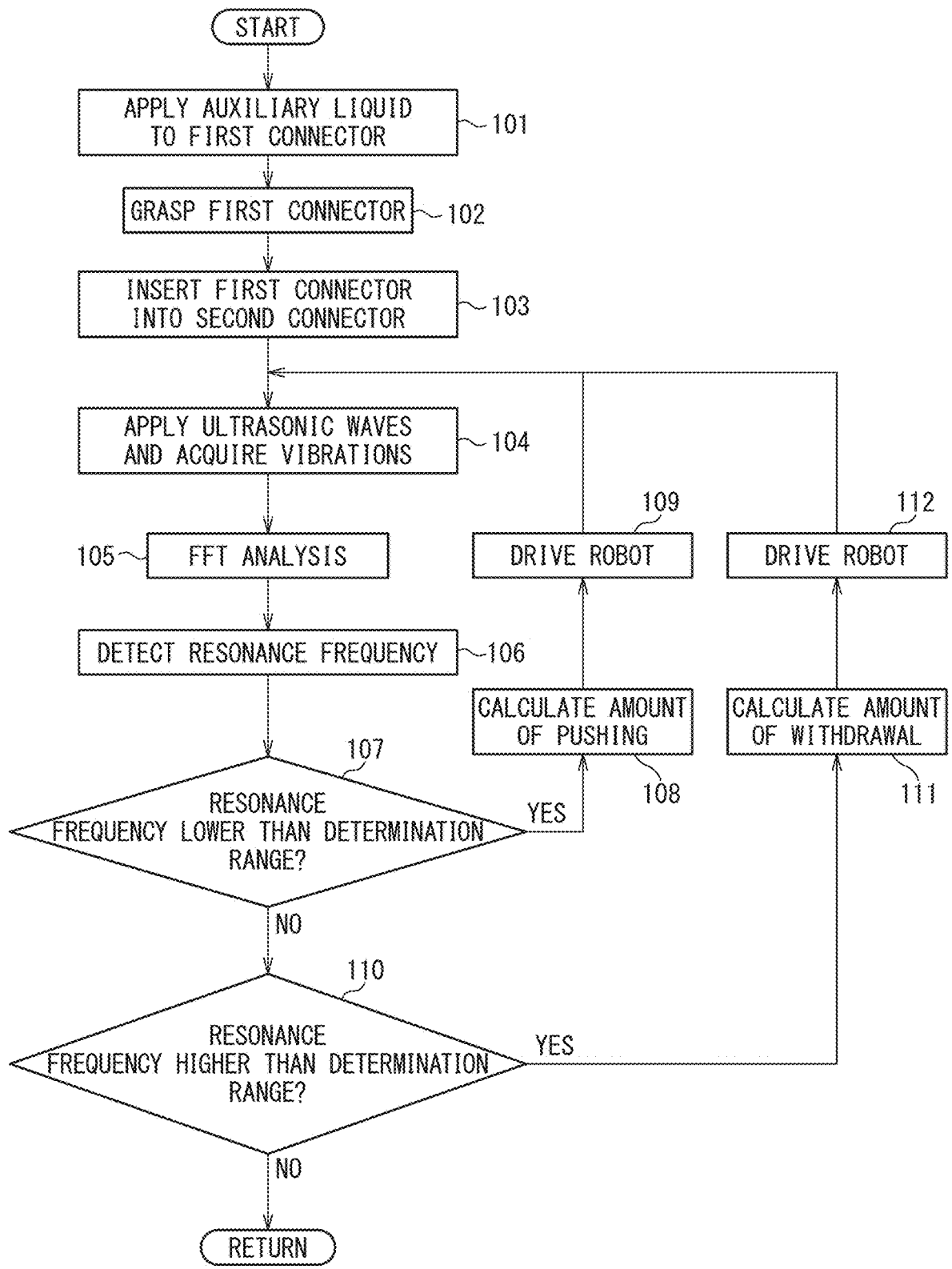
FIG. 16 is a flowchart of control of the robot device in an embodiment.

FIG. 16 is a flowchart of control of the robot device in the present embodiment. The control shown in FIG. 16 can be performed each time one first connector 66 is inserted. Referring to FIGS. 1 and 2, first connectors 66, each of which is to be attached to the second connector 67 secured to a substrate 65, are arranged on a case 87. At step 101, ethanol as an auxiliary liquid is applied to the surface of each first connector 66 disposed on the case 87.

Figure 17:
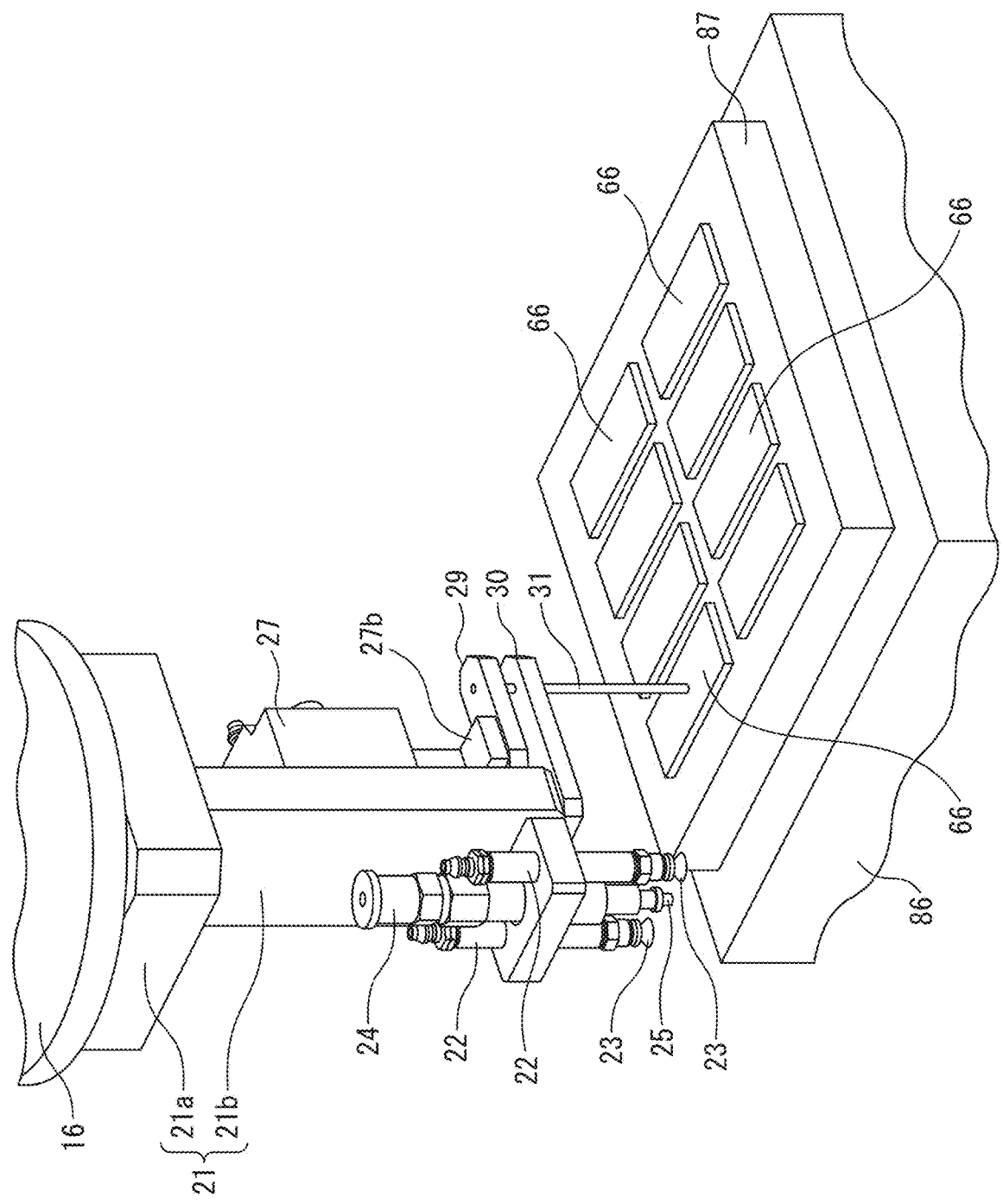
FIG. 17 is an enlarged perspective view of the robot device when the auxiliary liquid is applied to the surface of the first connector in the robot device.

FIG. 17 is an enlarged perspective view of the operation tool when the auxiliary liquid is applied to each first connector. Referring to FIGS. 5 and 17, the motion control unit 43 of the robot controller 4 causes the robot 1 to change its position and orientation so that the supply tube 31 of the operation tool 2 is disposed directly above each first connector 66 disposed on the case 87. The motion control unit 43 drives the cylinder 27 so as to move the supply tube 31. The supply tube 31 moves downward. The tip of the supply tube 31 projects downward beyond the lower end of the vibration detector 24 and the lower ends of the suction parts 22. The tip of the supply tube 31 is located slightly above the surface of the first connector 66. As described above, the operation tool 2 includes the mechanism for moving the supply tube 31, and accordingly, when the auxiliary liquid is supplied through the supply tube 31, the suction parts 22 or the vibration detector 24 can be prevented from coming into contact with the first connectors 66 arranged on the case 87.

The supply tube 31 is disposed directly above the portion of the surface of the first connector 66, with which the element component 25 is to be in contact. The motion control unit 43 drives the auxiliary liquid supply device so as to drop the auxiliary liquid to the portion with which the element component 25 of the vibration detector 24 is to be in contact. Thereafter, the motion control unit 43 drives the cylinder 27 so as to return the supply tube 31 to the original position.

Referring to FIG. 16, at step 102, the robot controller 4 causes the robot 1 to change its position and orientation, so as to grasp each first connector 66 by the suction parts 22. At this time, the element component 25 of the vibration detector 24 comes into contact with the surface of the first connector 66. Further, an auxiliary liquid is supplied to a portion where the element component 25 and the surface of the first connector 66 are in contact with each other. Even when the element component 25 comes into contact with the surface of the first connector 66, a slight gap may be formed between the element component 25 and the surface of the first connector 66. The auxiliary liquid fills the gap. For this reason, ultrasonic waves generated from the element component 25 can be efficiently transmitted to the first connector 66 via the auxiliary liquid.

The robot device in the present embodiment includes the supply tube and the auxiliary liquid supply device for supplying the auxiliary liquid. However, the embodiment is not limited to this. The operation tool may not include the supply tube and the auxiliary liquid supply device.

Subsequently, at step 103, the first connector 66 is inserted into the second connector 67. Referring to FIGS. 3 and 7, the robot controller 4 causes the robot 1 to change its position and orientation, so as to insert the projection part 66a of the first connector 66 into the recess part 67a of the second connector 67. Thereafter, the robot 1 stops and maintains the position and orientation.

Subsequently, at step 104, the oscillation control unit 75 of the vibration controller 7 controls the oscillator 25a so as to generate ultrasonic waves while the suction parts 22 grasp the first connector 66. The vibration receiver 25b receives vibrations generated in the first connector 66 and the second connector 67.

Subsequently, at step 105, the conversion unit 71 of the analysis unit 70 converts, by Fourier transform, the intensity of vibrations acquired as a function of time. In the present embodiment, FFT (Fast Fourier Transform) analysis is performed. As a result, as shown in FIGS. 11, 13 and 15, a graph (power spectrum) of the vibration intensity with respect to the frequency can be obtained.

Subsequently, at step 106, the resonance frequency detection unit 72 of the analysis unit 70 detects the resonance frequency when the first connector 66 is inserted into the second connector 67.

Subsequently, at step 107, the determination unit 73 of the analysis unit 70 determines whether the resonance frequency detected by the resonance frequency detection unit 72 is lower than the determination range. If the resonance frequency is lower than the determination range at step 107, the control shifts to step 108. For example, when the resonance frequency is in the states shown in FIGS. 11 and 13, the control shifts to step 108.

At step 108, the motion command unit 74 calculates the amount of pushing of the first connector 66 (the amount of movement of the robot 1) based on the resonance frequency detected by the resonance frequency detection unit 72 and the reference resonance frequency. The motion command unit 74 calculates the position and orientation of the robot 1 after the first connector 66 is pushed.

Subsequently, at step 109, the motion command unit 74 transmits the corrected position and orientation of the robot 1 to the robot controller 4. The motion control unit 43 of the robot controller 4 drives the robot 1 so that the robot 1 takes the acquired position and orientation. Note that the motion command unit 74 may transmit the movement amount of the robot 1 to the robot controller 4. The motion control unit 43 of the robot controller 4 may drive the robot 1 based on the movement amount of the robot 1. Thereafter, the control returns to step 104.

If the resonance frequency remains within the determination range or is higher than the determination range at step 107, the control shifts to step 110. At step 110, the determination unit 73 determines whether the resonance frequency detected by the resonance frequency detection unit 72 is higher than the determination range. If the resonance frequency is higher than the determination range at step 110, the control shifts to step 111. For example, when the resonance frequency is in the state shown in FIG. 15, the control shifts to step 111.

At step 111, the motion command unit 74 calculates the amount of withdrawal of the first connector 66 (the amount of movement of the robot 1) based on the resonance frequency detected by the resonance frequency detection unit 72 and the reference resonance frequency. The motion command unit 74 calculates the position and orientation of the robot 1 after the first connector 66 has been withdrawn. The motion command unit 74 transmits the corrected position and orientation of the robot 1 to the robot controller 4. The robot controller 4 drives the robot 1 so that the robot 1 takes the acquired position and orientation. Then, the control returns to step 104. Thus, in the correction control operation of the present embodiment, the movement of the robot 1 is repeated until the resonance frequency detected in accordance with the insertion state of the first connector 66 falls within the determination range.

If the resonance frequency is not higher than the determination range at step 110, the resonance frequency detected by the resonance frequency detection unit 72 falls within the determination range. In other words, it can be determined that the insertion amount of the first connector 66 is appropriate. In this respect, this control ends. The substrate 65 to which the first connector 66 has been attached is replaced with a new substrate 65, and another first connector 66 is attached to the new substrate 65.

In the robot device 5 in the present embodiment, after the first connector 66 is inserted into the second connector 67, it is possible to determine whether the insertion amount of the first connector 66 is appropriate. Further, when the insertion amount of the first connector 66 is not appropriate, the movement amount of the robot 1 is calculated so that the insertion amount of the first connector 66 is an appropriate insertion amount, and the robot 1 is automatically driven. For this reason, in the robot device 5 in the present embodiment, the first connector 66 can be attached to the second connector 67 at an appropriate depth.

In particular, the inspection device 8 of the present embodiment is formed so that the insertion amount of the first connector 66 can be inspected while the first connector 66 is grasped by the suction parts 22. Thus, the insertion of the first connector 66, the inspection of the insertion amount of the first connector 66, and the driving of the robot for adjusting the insertion amount can be continuously performed. As a result, the first connector 66 can be appropriately inserted in a short time.

Figure 18:
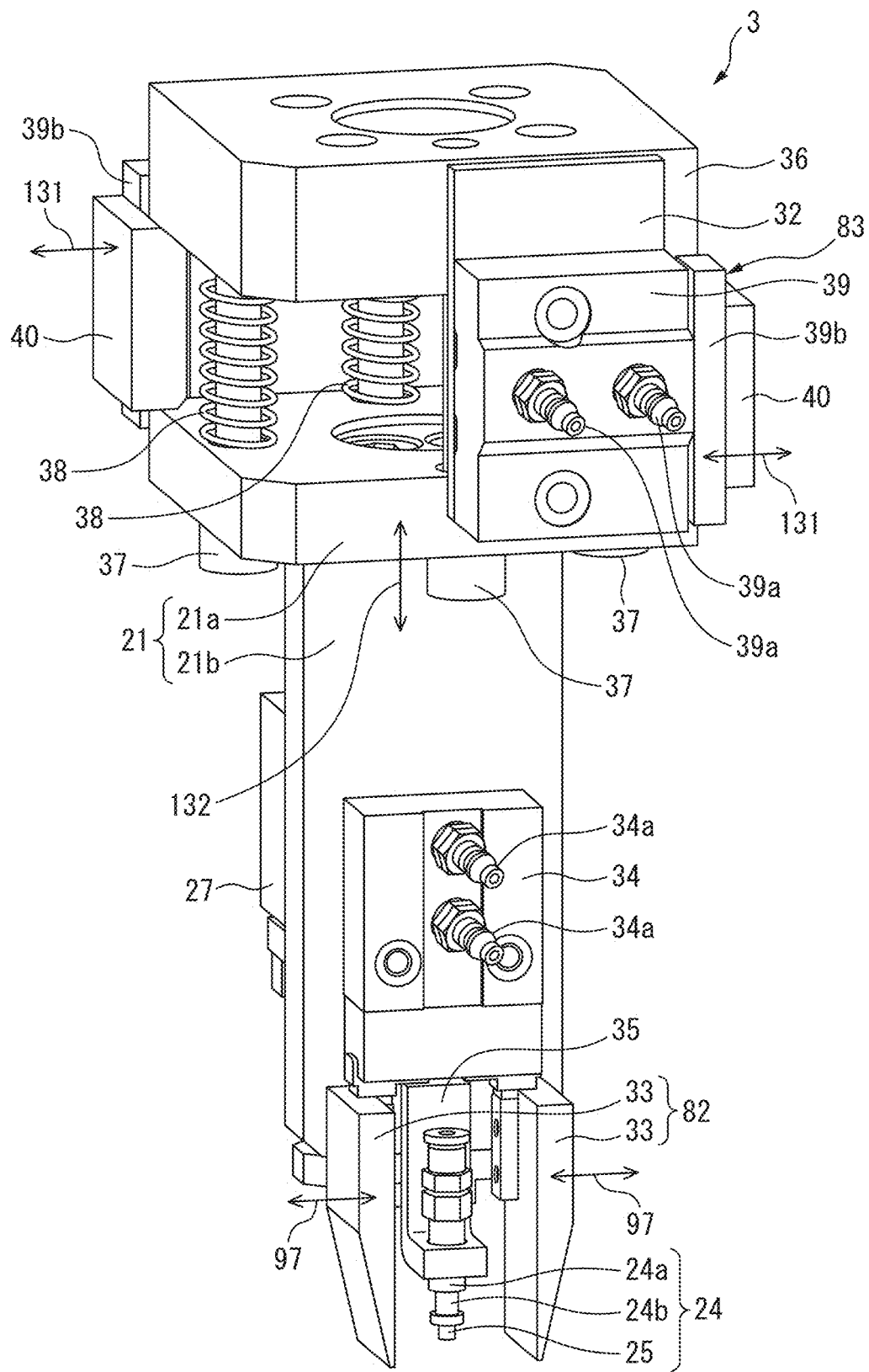
FIG. 18 is a perspective view of the second operation tool in an embodiment when viewed from the front side.
Figure 19:
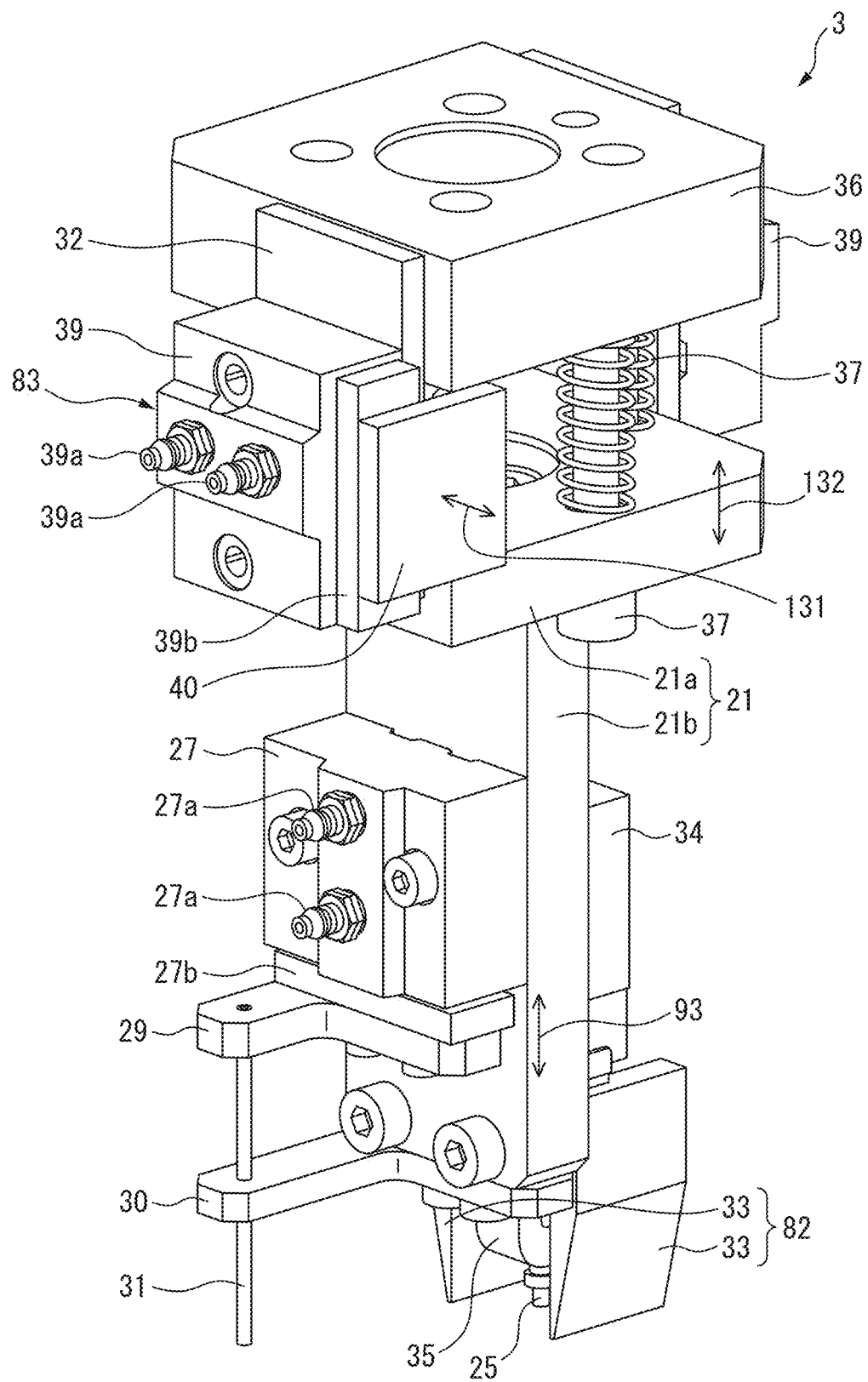
FIG. 19 is a perspective view of the second operation tool when viewed from the rear side.

FIG. 18 is a perspective view of the second operation tool in the present embodiment when viewed from the front side. FIG. 19 is a perspective view of the second operation tool in the present embodiment when viewed from the rear side. Referring to FIGS. 18 and 19, in the second operation tool 3 of the present embodiment, a grasping mechanism 82 for grasping each first connector 66 grasps the first connector 66 so as to sandwich the same. The operation tool 3 has a cylinder 34 secured to the erected part 21b of the base member 21. The cylinder 34 has air ports 34a to which air tubes for supplying pressurized air are connected. The air tubes are connected to an air supply device. The air supply device is controlled by the operation tool drive part 44.

Two claw parts 33 facing each other are connected to the cylinder 34. The cylinder 34 is driven and thereby moves the claw parts 33 toward each other and away from each other as designated by arrow 97. The movement of the claw parts 33 allows the first connector 66 to be grasped or released.

The vibration detector 24 for detecting vibrations of the first connector 66 is disposed between the two claw parts 33. The vibration detector 24 is secured to the erected part 21b of the base member 21 via a support member 35. Even in the second operation tool 3, the first connector 66 can be grasped while the element component 25 of the vibration detector 24 is in contact with the first connector 66.

In the meantime, in the first operation tool 2 shown in FIGS. 4 and 5, the first connector 66 is secured to the suction pads 23. The suction pads 23 are formed of a shape-variable material, and accordingly, vibrations generated in the robot 1 are absorbed by the suction pads 23.

Meanwhile, in the second operation tool 3 shown in FIGS. 18 and 19, the first connector 66 is grasped by the claw parts 33. The claw parts 33 are formed of a rigid material such as a metal, and accordingly, vibrations generated in the robot 1 may be transmitted to the first connector 66 via the claw parts 33. The second operation tool 3 has a mechanism for absorbing the vibrations of the robot 1. The second operation tool 3 includes a fixation member 36 secured to the flange 16 of the robot 1 and a connection mechanism 83 for coupling the fixation member 36 to the base member 21. The connection mechanism 83 of the present embodiment includes a floating mechanism having a function of allowing the grasping mechanism 82 to move freely with respect to the robot 1.

The fixation member 36 is spaced from the flange part 21a of the base member 21. The connection mechanism 83 includes a plurality of bolts 37 which pass through the flange part 21a. The tips of the bolts 37 are secured to the fixation member 36. Meanwhile, the flange part 21a is formed so as to move with respect to the bolts 37. The holes of the flange part 21a, through which the bolts 37 are inserted, are formed so as to be slightly larger than the diameter of the bolts 37. The connection mechanism 83 includes springs 38 each disposed around the bolt 37. The springs 38 are disposed between the fixation member 36 and the flange part 21a. The springs 38 are formed so as to bias the flange part 21a away from the fixation member 36. The springs 38 are disposed, so that the base member 21 can be prevented from wobbling when the securing of the base member 21 to the fixation member 36 is released.

The connection mechanism 83 includes cylinders 39 and the interpolation members 40 which move with the cylinders

39. Plate-like members 32 to which the cylinders 39 are secured are secured to the fixation member 36. Meanwhile, the plate-like members 32 are not secured to the flange part 21*a*. Each cylinder 39 has air ports 39*a* to which pressurized air is supplied, and a piston 39*b*. An air supply device is connected to the air ports 39*a* via air tubes. This air supply device is controlled by the operation tool drive part 44.

Each interpolation member 40 is secured to the piston 39*b*. The interpolation members 40 are formed so as to be fitted between the fixation member 36 and the flange part 21*a* while the fixation member 36 and the flange part 21*a* are farthest apart from each other. The cylinders 39 are driven and thereby move the pistons 39*b* and the interpolation members 40 in the direction designated by arrow 131. When the interpolation members 40 are separated from the fixation member 36 and the flange part 21*a*, the securing of the base member 21 to the fixation member 36 is released, and the base member 21 can move in the direction designated by arrow 132. The base member 21 moves freely in a direction perpendicular to the surface of the first connector 66. In contrast, when the interpolation members 40 are inserted between the fixation member 36 and the flange part 21*a*, the movement of the base member 21 with respect to the fixation member 36 is prevented. In other words, the base member 21 is stationary with respect to the fixation member 36.

As described above, the connection mechanism 83 of the second operation tool 3 is formed so that a state in which the relative position of the base member 21 with respect to the fixation member 36 is fixed and a state in which the base member 21 freely moves with respect to the fixation member 36 are switched. When the first connector 66 is grasped, or the first connector 66 is transported, the cylinders 39 insert the interpolation members 40 between the fixation member 36 and the flange part 21*a*. The base member 21 is stationary with respect to the fixation member 36. Thus, the first connector 66 can be stably grasped and transported.

Meanwhile, when the vibration detector 24 detects vibrations of the first connector 66, the cylinders 39 space the interpolation members 40 from the fixation member 36 and the flange part 21*a*. The base member 21 is not secured to the fixation member 36, and accordingly, the vibrations generated by the robot 1 can be prevented from being transmitted to the base member 21. The vibrations generated in the robot 1 can be prevented from being propagated to the first connector 66. As a result, it is possible to accurately measure the resonance frequency of the first connector 66 while avoiding the influence of vibrations generated in the robot 1.

The connection mechanism 83 of the present embodiment is formed so that the interpolation members 40 are inserted between the fixation member 36 and the base member 21, but the embodiment is not limited to this. As the connection mechanism, any mechanism, which can switch between a state in which the base member on which the grasping mechanism and the vibration detector are secured can freely move and a state in which the base member is stationary, can be adopted.

Other configurations, operations, and effects of the second operation tool 3 are identical to those of the first operation tool 2, and thus, will not be described again.

The grasping mechanisms 81, 82 for grasping a connector in the present embodiment include the suction parts 22 or the claw parts 33, but the embodiment is not limited to this. Any mechanism for grasping a connector can be adopted as the grasping mechanism. For example, the grasping mechanism may be formed so as to grasp the connector by magnetic force.

In the robot device 5 of the present embodiment, the robot controller 4 and the vibration controller 7 are disposed, but the embodiment is not limited to this. The robot controller may have functions of the vibration controller. For example, the robot controller may be formed so as to control an oscillator and analyze vibrations received by a vibration receiver.

Figure 20:
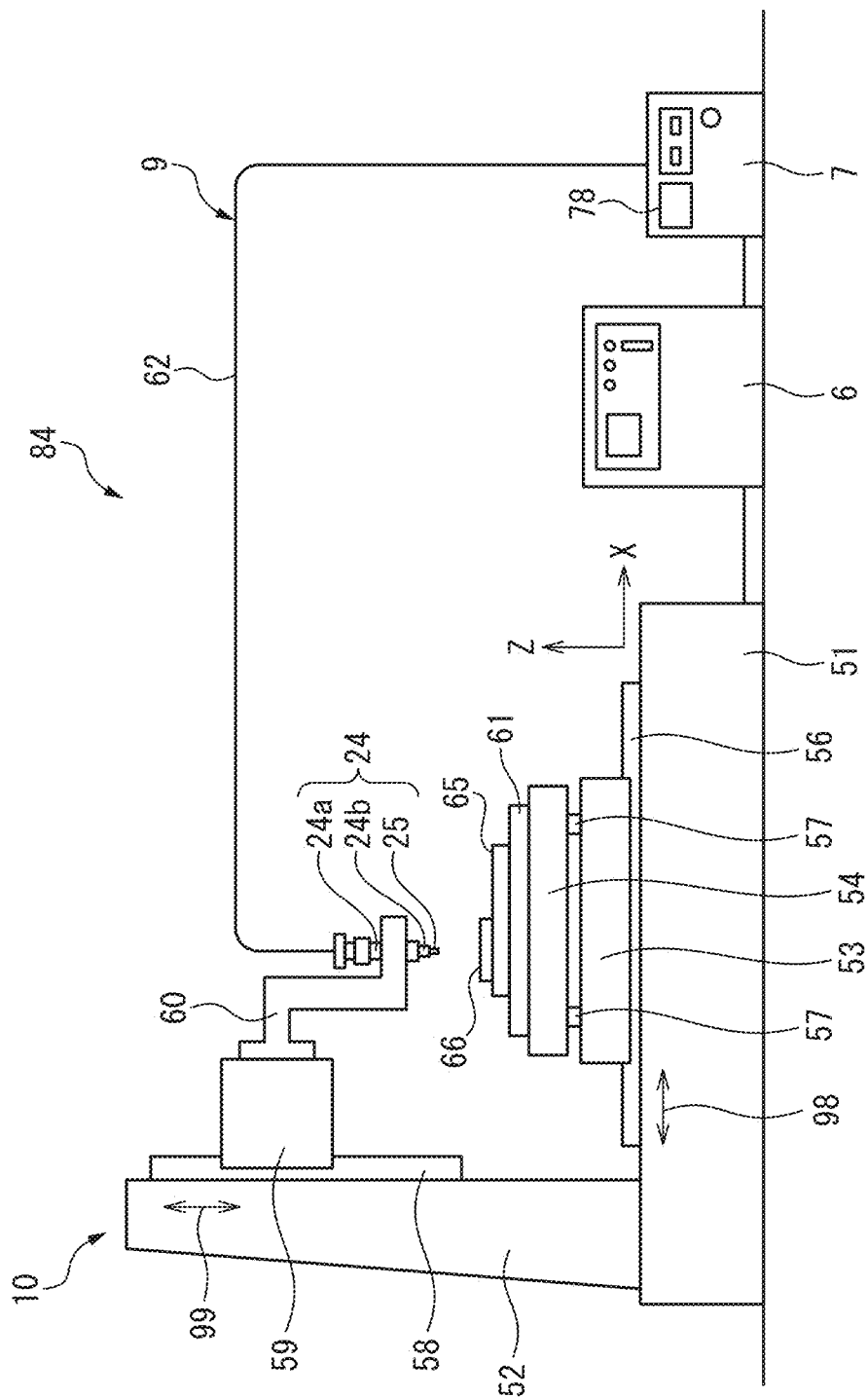
FIG. 20 is a schematic diagram of an inspection system in an embodiment.
Figure 21:
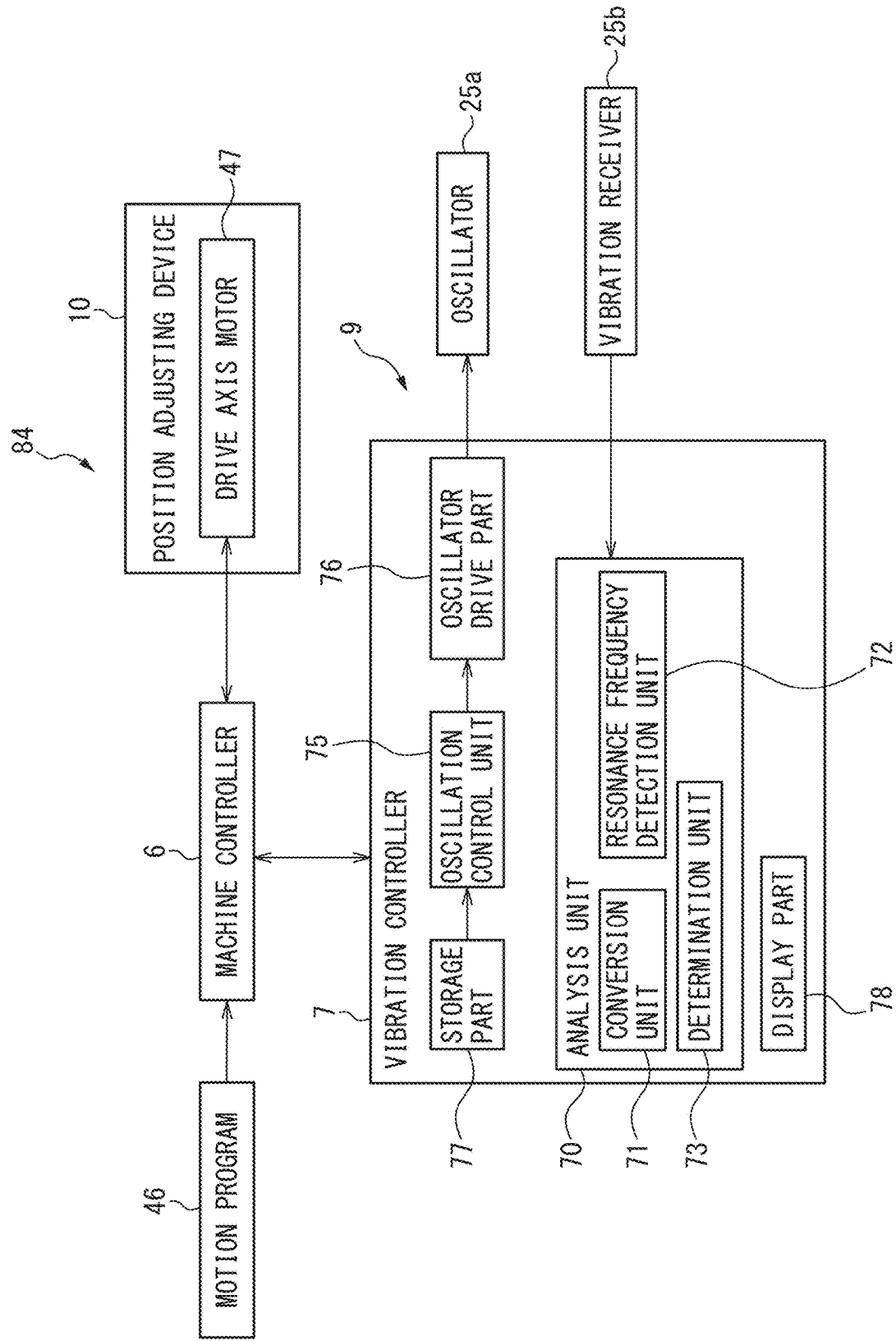
FIG. 21 is a block diagram of the inspection system.

FIG. 20 is a schematic view of the inspection system of the present embodiment. FIG. 21 is a block diagram of the inspection system of the present embodiment. In the above embodiments, the inspection device including the grasping mechanism for grasping a connector is disposed in the robot device, but the embodiment is not limited to this. The inspection device of the present embodiment can be disposed in various devices or systems. FIGS. 20 and 21 show the inspection system disposed in a process of manufacturing a product.

Referring to FIGS. 20 and 21, an inspection system 84 includes a position adjusting device 10 which adjusts the relative position of the substrate 65 with respect to the vibration detector 24. In the inspection system 84, a first connector 66 inserted into a second connector 67 is conveyed to the position adjusting device 10. The inspection system 84 determines the insertion amount of the first connector 66 into the second connector 67, without the insertion of the first connector 66.

The position adjusting device 10 includes a bed 51 as a cradle, and a column 52 standing from the bed 51. An X-axis guide rail 56 extending in the X-axis direction is disposed on the upper surface of the bed 51. A saddle 53 is disposed on the X-axis guide rail 56. The saddle 53 is formed so as to move along the X-axis guide rail 56 as designated by arrow 98. A Y-axis guide rail 57 extending in the Y-axis direction is disposed on the upper surface of the saddle 53. A table 54 is disposed on the Y-axis guide rail 57. The table 54 is formed so as to move along the Y-axis guide rail 57. The substrate 65 is secured to the table 54 via a substrate grasping member 61.

The column 52 is provided with a Z-axis guide rail 58 extending in the Z-axis direction. A movement member 59 is engaged with the Z-axis guide rail 58. The vibration detector 24 is secured to the movement member 59 via an arm 60. The movement member 59 is formed so as to move along the Z-axis guide rail 58 as designated by arrow 99.

The position adjusting device 10 of the present embodiment is a numerical control adjusting device. The position adjusting device 10 includes a drive device which moves at least one of the movement member 59 for supporting the vibration detector 24 along a feed axis and a table 54 for supporting the substrate 65. The inspection system 84 includes a machine controller 6 which controls the position adjusting device 10. The machine controller 6 controls the drive device. The machine controller 6 includes an arithmetic processing device (computer) including, for example, a CPU and a RAM. The position adjusting device 10 includes drive axis motors 47 disposed corresponding to the respective feed axes. In the position adjusting device 10 of the present embodiment, the movement member 59, the saddle 53, and the table 54 are moved by the drive axis motors 47. The machine controller 6 drives the drive axis motors 47 corresponding to the feed axes, based on the motion program 46.

In the position adjusting device 10 of the present embodiment, the substrate 65 moves in the X-axis direction and the Y-axis direction, while the vibration detector 24 moves in the Z-axis direction. However, the embodiment is not limited to this. The relative position of the vibration detector with respect to the first connector can be changed by any mechanism.

The inspection system 84 includes a second inspection device 9. The second inspection device 9 does not include an operation tool for grasping a first connector 66 and a device for supplying a propagation promoter. The second inspection device 9 includes a vibration detector 24 including an oscillator 25a and a vibration receiver 25b. The vibration detector 24 is supported by an arm 60 and moves together with the arm 60. The second inspection device 9 includes a vibration controller 7 connected to the vibration detector 24 via a cable 62. The vibration controller 7 includes a display part 78 which displays information on the insertion of a connector. A motion command unit for transmitting a command for operating the robot is not disposed in an analysis unit 70 of the vibration controller 7. The other configuration of the second inspection device 9 is identical to the configuration of the first inspection device 8 (see FIG. 2).

In the position adjusting device 10 of the present embodiment, the relative position of the vibration detector 24 with respect to the substrate 65 can be changed. The machine controller 6 moves the table 54 in the X-axis direction and the Y-axis direction such that the first connector 66 is disposed immediately below the vibration detector 24. Further, the machine controller 6 moves the movement member 59 in the Z-axis direction so that the vibration detector 24 comes into contact with the first connector 66. The magnitude of a pressing force for bringing the vibration detector 24 into contact with the first connector 66 can be adjusted based on, for example, the current supplied to the drive axis motor 47 for Z-axis and the position of the movement member 59. The machine controller 6 can adjust the position of the movement member 59 so as to slightly press the vibration detector 24 against the first connector 66.

The second inspection device 9 of the inspection system 84 in the present embodiment can determine whether the first connector 66 is inserted into the second connector 67 by an appropriate insertion amount, as in the first inspection device 8.

Further, when the resonance frequency detected by the resonance frequency detection unit 72 deviates from the determination range, the determination unit 73 of the analysis unit 70 may calculate the length of insufficient insertion or the length of excessive insertion. For example, the determination unit 73 calculates a difference Δf between the reference resonance frequency fc and the resonance frequency detected by the resonance frequency detection unit 72. The insertion position (insertion depth) of the first connector 66 with respect to the difference Δf in resonance frequency is previously determined and stored in the storage part 77. The determination unit 73 can calculate the insertion position of the first connector 66 based on the difference Δf in resonance frequency. In addition, the determination unit 73 can calculate the length of insufficient insertion or the length of excessive insertion based on the insertion position of the first connector 66.

The determination result made by the determination unit 73 can be displayed on the display part 78. Alternatively, the determination result made by the determination unit 73 can be transmitted to another device. Other functions and effects of the second inspection device are identical to those of the first inspection device, and thus, will not be described again.

In the inspection system 84 of the present embodiment, a machine controller 6 and the vibration controller 7 are disposed. However, the embodiment is not limited to this. The machine controller may have functions of the vibration controller. Further, the inspection system may include an operation tool and a device for supplying a propagation promoter. For example, the operation tool in the present embodiment may be secured to an arm of the position adjusting device.

According to an aspect of the present disclosure, it is possible to provide an inspection device which determines an insertion amount of one connector when one connector is inserted into another connector, and a robot device including the inspection device.

In each of the above-described control operations, the order of the steps can be appropriately changed as long as the functions and actions are not changed.

The above embodiments can be combined as appropriate. In the respective drawings described above, the same or equivalent parts are denoted by the same reference numerals. The above embodiments are only for illustrative purposes and do not limit the invention. Further, the embodiments include modifications of the embodiments described in the claims.

The invention claimed is:

1. An inspection device for inspecting a state in which a first connector having a shape to be fitted to a second connector is inserted into the second connector, the inspection device comprising:
    an oscillator configured to generate ultrasonic waves toward the first connector;
    a vibration receiver configured to receive vibrations generated in the first connector; and
    a vibration controller configured to drive the oscillator and analyze the vibrations received by the vibration receiver, wherein
    the vibration controller is configured to
        detect a resonance frequency by converting, by Fourier transform, the vibrations received by the vibration receiver, and
        determine, based on the detected resonance frequency, an insertion amount of the first connector into the second connector, and
    the vibration controller is configured to, in response to determining the detected resonance frequency being lower than a determination range, wherein the determination range is previously determined when the first connector is inserted into the second connector by an appropriate insertion amount,
        calculate, based on the detected resonance frequency, (i) a pushing amount of the first connector for correcting the insertion amount to the appropriate insertion amount, and (ii) a position and orientation of a robot after the first connector is pushed by the pushing amount, wherein the robot is configured to move the first connector, and
        transmit the calculated position and orientation to a robot controller to drive the robot to the calculated position and orientation.

2. The inspection device according to claim 1, wherein the vibration controller is configured to determine that the insertion amount of the first connector is small in response to the detected resonance frequency being lower than the determination range.

3. The inspection device according to claim 1, wherein the vibration controller is configured to control the oscillator so that the oscillator generates the ultrasonic waves while continuously changing the resonance frequency.

4. The inspection device according to claim 1, further comprising an operation tool including the oscillator and the vibration receiver, wherein the operation tool includes
a grasping mechanism configured to grasp the first connector, and
a base member supporting the grasping mechanism, the oscillator, and the vibration receiver,
the oscillator is configured to supply the ultrasonic waves to the first connector while the first connector is grasped by the grasping mechanism, and
the vibration receiver is configured to receive the vibrations generated in the first connector while the first connector is grasped by the grasping mechanism.

5. The inspection device according to claim 4, wherein the operation tool further includes a supply tube which is supported by the base member and configured to supply a liquid propagation promoter for promoting the propagation of vibrations to the surface of the first connector.

6. A robot device comprising:
the inspection device according to claim 4;
the robot configured to move the operation tool; and
the robot controller configured to control the robot, wherein
a reference resonance frequency when the first connector is inserted into the second connector by the appropriate insertion amount is previously determined,
the vibration controller is configured to
calculate, based on the resonance frequency detected when the first connector is inserted into the second connector and the reference resonance frequency, the position and orientation of the robot, at which the insertion amount of the first connector is appropriate, and
transmit the calculated position and orientation to the robot controller, and
the robot controller configured to drive the robot so that the robot takes the position and orientation received from the vibration controller.

7. An inspection device for inspecting a state in which a first connector having a shape to be fitted to a second connector is inserted into the second connector, comprising:

an oscillator for generating ultrasonic waves toward the first connector;
a vibration receiver for receiving vibrations generated in the first connector;
an operation tool including the oscillator and the vibration receiver; and
a vibration controller for driving the oscillator and analyzing the vibrations received by the vibration receiver, wherein
the vibration controller detects a resonance frequency by a time-to-frequency transform of the vibrations received by the vibration receiver, and determines, based on the detected resonance frequency, an insertion amount of the first connector into the second connector,
the operation tool includes a grasping mechanism for grasping the first connector, and a base member for supporting the grasping mechanism, the oscillator, and the vibration receiver,
the oscillator is disposed so as to supply vibrations to the first connector while the first connector is grasped by the grasping mechanism,
the vibration receiver is disposed so as to receive vibrations generated in the first connector while the first connector is grasped by the grasping mechanism,
the operation tool includes a fixation member secured to a device for moving the operation tool, and a connection mechanism for coupling the fixation member to the base member, and
the connection mechanism is formed so as to switch between a state in which the relative position of the base member with respect to the fixation member is stationary and a state in which the base member freely moves with respect to the fixation member in a direction substantially perpendicular to the surface of the first connector.

* * * * *